United States Patent
Dong et al.

(10) Patent No.: US 12,016,002 B2
(45) Date of Patent: Jun. 18, 2024

(54) COMMUNICATION METHOD AND COMMUNICATIONS APPARATUS

(71) Applicant: Huawei Technologies Co., Ltd., Shenzhen (CN)

(72) Inventors: Lei Dong, Shanghai (CN); Hongjia Su, Shanghai (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 17/508,632

(22) Filed: Oct. 22, 2021

(65) Prior Publication Data

US 2022/0046639 A1 Feb. 10, 2022

Related U.S. Application Data

(63) Continuation of application No. PCT/CN2020/086424, filed on Apr. 23, 2020.

(30) Foreign Application Priority Data

Apr. 24, 2019 (CN) .......................... 201910335535.7

(51) Int. Cl.
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC . H04W 72/0446; H04W 72/40; H04W 72/02; H04W 72/04
See application file for complete search history.

(56) References Cited

U.S. PATENT DOCUMENTS 10,342,038 B2 * 7/2019 Sun .................. H04W 72/23
10,959,253 B2 * 3/2021 Moon ................ H04L 5/0007
(Continued)

FOREIGN PATENT DOCUMENTS

CN 108632781 A 10/2018
CN 108702740 A 10/2018
(Continued)

OTHER PUBLICATIONS

3GPP TS 36.213 V15.5.0 (Mar. 2019), 3rd Generation Partnership Project; Technical Specification Group Radio Access Network; Evolved Universal Terrestrial Radio Access (E-UTRA); Physical layer procedures(Release 15), 552 pages.
(Continued)

*Primary Examiner* — Raj Jain
(74) *Attorney, Agent, or Firm* — Slater Matsil, LLP

(57) ABSTRACT

This application provides a method includes: If a first terminal device has to-be-sent periodic data, the first terminal device determines a first time unit set. The first terminal device determines that a first time unit in the first time unit set is used to send the periodic data, and determines, from the first time unit set based on a first time domain interval and a reservation quantity N, a second time unit set used to send the periodic data. A time domain interval between the $1^{st}$ time unit in the second time unit set and the first time unit is the first time domain interval, and a number of a time unit in the second time unit set is greater than that of the first time unit. The method may be used in an internet of vehicles, for example, V2X, LTE-V, or V2V.

20 Claims, 10 Drawing Sheets

(56) References Cited

U.S. PATENT DOCUMENTS

| | | | |
|---|---|---|---|
| 11,071,163 | B2 | 7/2021 | Yasukawa et al. |
| 11,134,508 | B2* | 9/2021 | Zhang .................. H04W 72/56 |
| 11,297,604 | B2* | 4/2022 | Wu ........................ H04W 72/04 |
| 11,412,480 | B2 | 8/2022 | Yasukawa et al. |
| 2016/0183167 | A1 | 6/2016 | Agiwal et al. |
| 2018/0098322 | A1 | 4/2018 | Yoon |
| 2021/0227412 | A1* | 7/2021 | Jiang .................... H04L 1/1887 |
| 2021/0321449 | A1* | 10/2021 | Zhao .................. H04W 74/002 |
| 2022/0046639 | A1* | 2/2022 | Dong ................... H04W 72/20 |

FOREIGN PATENT DOCUMENTS

| | | |
|---|---|---|
| CN | 108810906 A | 11/2018 |
| CN | 109392137 A | 2/2019 |
| EP | 3429299 A1 | 4/2016 |
| EP | 3326348 A1 | 5/2018 |
| JP | 2016039510 A | 3/2016 |
| JP | 2018026736 A | 2/2018 |
| WO | 2015021185 A1 | 2/2015 |
| WO | 2018058963 A1 | 4/2018 |
| WO | 2018174661 A1 | 9/2018 |
| WO | 2018184501 A1 | 10/2018 |

OTHER PUBLICATIONS

3GPP TS 38.212 V15.5.0 (Mar. 2019), 3rd Generation Partnership Project; Technical Specification Group Radio Access Network; NR; Multiplexing and channel coding (Release 15), 101 pages.

3GPP TS 38.213 V15.5.0 (Mar. 2019), 3rd Generation Partnership Project; Technical Specification Group Radio Access Network; NR; Physical layer procedures for control (Release 15), 104 pages.

3GPP TS 38.214 V15.5.0 (Mar. 2019), 3rd Generation Partnership Project; Technical Specification Group Radio Access Network; NR; Physical layer procedures for data (Release 15), 103 pages.

3GPP TS 38.321 V15.5.0 (Mar. 2019), 3rd Generation Partnership Project; Technical Specification Group Radio Access Network; NR; Medium Access Control (MAC) protocol specification (Release 15), 78 pages.

Intel Corporation, "Feature Lead Summary for NR-V2X AI-7.2.4. 1.4 Resource Allocation Mechanism," 3GPP TSG RAN WG1 Meeting #96, Athens, Greece, Feb. 25-Mar. 1, 2019, R1-1903623, 18 pages.

Intel Corporation, "Sidelink Resource Allocation Design for NR V2X Communication," 3GPP TSG RAN WG1 Meeting #96bis, Xi'an, China, Apr. 8-12, 2019, R1-1904296, 15 pages.

"Corrections for Shortened Processing Time and Shortened TTI in 36213, s14-xx," Source to WG: Motorola Motility, Work Item Code: LTE_sTTIandPT-Core, Date: May 7, 2018, Category: F, Release: Rel-15, Change Request, 3GPP TSG RAN WG1 Meeting #92bis, R1-1805498, Sanya, P.R. China, Apr. 16-20, 2018, 61 pages.

"Discussion on Physical Layer Structures for NR V2X," Agenda Item: 7.2.4.1.1, Source: Samsung, Document for: Discussion and Decision, 3GPP TSG RAN WG1 #95, R1-1813866, Spokane, USA, Nov. 12-16, 2016, 13 pages.

3GPP TS 38.331 V15.5.1, "3rd Generation Partnership Project; Technical Specification Group Radio Access Network; NR; Radio Resource Control (RRC) protocol specification (Release 15)," Apr. 2019, 491 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2020/086424, filed on Apr. 23, 2020, which claims priority to Chinese Patent Application No. 201910335535.7, filed on Apr. 24, 2019. The disclosures of the aforementioned applications are hereby incorporated by reference in their entireties.

TECHNICAL FIELD

This application relates to the communications field, and more specifically, to a communication method and a communications apparatus.

BACKGROUND

Based on a network corresponding to a long term evolution (LTE) technology proposed by the 3rd Generation Partnership Project (3GPP), an internet of vehicles technology for vehicle-to-everything (V2X) communication is proposed. The V2X communication is communication between a vehicle and anything in the external world. V2X based on the network corresponding to the LTE technology may be referred to as LTE V2X for short. Communication between terminal devices in a V2X system is widely referred to as sidelink (SL) communication.

LTE V2X communication can support communication scenarios with and without network coverage. SL communication resource configuration modes may include an evolved NodeB (eNB or eNodeB) scheduling mode and a terminal device self-selection mode in an LTE system. With development of the 5th generation new radio (5G NR) technology in the 3GPP specifications organization, V2X in a network corresponding to the 5G NR technology will be further developed. For example, V2X can support a lower transmission latency, more reliable communication transmission, a higher throughput, and better user experience, satisfying requirements for a wider range of application scenarios. However, due to flexibility of a frame structure in a 5G NR scenario, the terminal device self-selection resource mode and the network device configuration resource mode in which transmission resources are determined for periodic data in LTE V2X are no longer applicable to the 5G NR scenario. Therefore, how to determine transmission resources for periodic data in a 5G NR scenario becomes an issue to be resolved urgently.

SUMMARY

This application provides a communication method and a communications apparatus. A first time unit used to send periodic data is determined from a first time unit set, and a second time unit set used to send the periodic data is determined from the first time unit set based on a first time domain interval and a reservation quantity N, to determine transmission resources for periodic data in a 5G NR scenario.

According to a first aspect, a communication method is provided. The method includes: A first terminal device determines a first time unit set, where a time unit in the first time unit set is available for transmitting at least one of sidelink service data, sidelink control information, and sidelink feedback information, the first time unit set includes a plurality of time units, the plurality of time units are consecutively numbered in a time sequence, and the time unit includes a symbol or a slot. The first terminal device determines to-be-sent periodic data, where the periodic data includes at least one of the sidelink service data, the sidelink control information, and the sidelink feedback information. The first terminal device determines a first time unit from the first time unit set, where the first time unit is used to send the periodic data. The first terminal device determines a second time unit set from the first time unit set based on a first time domain interval and a reservation quantity N, where a time unit in the second time unit set is used to send the periodic data, the second time unit set includes N−1 time units, a time domain interval between the $1^{st}$ time unit in the second time unit set and the first time unit is the first time domain interval, a time domain interval between any two adjacent time units in the second time unit set is the first time domain interval, and a number of a time unit in the second time unit set is greater than that of the first time unit. The first terminal device sends the periodic data in the first time unit and the time unit that is in the second time unit set.

According to the communication method provided in this embodiment of this application, when the first terminal device needs to send periodic data, the first terminal device first determines, according to protocol stipulations, the first time unit set that may be used to send the periodic data, and then determines, from the first time unit set, the first time unit and the second time unit set that are used to send the periodic data. A time domain interval between a time unit in the second time unit set and the first time unit can be determined based on the first time domain interval and the reservation quantity N. In this way, in the communication method provided in this embodiment of this application, resources that can be used by the first terminal device to send the periodic data can be configured at a granularity of the time units, to determine the transmission resources for the periodic data in a 5G NR scenario.

It should be understood that, that the first time unit set and the second time unit set are used to send the periodic data means that a time-frequency resource corresponding to a time domain location indicated by the first time unit and the time unit that is in the second time unit set is used to carry and send the periodic data. Because only determining of a time domain location is involved in this application without involving determining of a frequency domain location of a time-frequency resource, the following brief description is provided: The first time unit and the second time unit set are used to send the periodic data.

It should also be understood that sending the periodic data in this application includes any one of the following possibilities: sending the sidelink service data (which may also be referred to as sending a physical sidelink data channel (PSSCH)); sending the sidelink control information (which may also be referred to as sending a physical sidelink control channel (PSCCH)); sending the sidelink feedback information (which may also be referred to as sending a physical sidelink feedback channel (PSFCH)); sending the sidelink service data and the sidelink control information; sending the sidelink service data and the sidelink feedback information; sending the sidelink control information and the sidelink feedback information; and sending the sidelink service data, the sidelink control information, and the sidelink feedback information.

It should also be understood that, that the time unit included in the first time unit set is available for transmitting the at least one of the sidelink service data, the sidelink control information, and the sidelink feedback information means: the first time unit set includes all time units in a system frame except a time unit used to send a sidelink synchronization signal (SLSS); or if the first terminal device operates in a time division duplex (TDD) mode, the first time unit set includes all time units in a system frame except a time unit used to send a sidelink synchronization signal (SLSS), and a downlink time unit and a special time unit that are in the TDD mode; or if a system frame includes a reserved time unit, the first time unit set includes all time units in the system frame except a time unit used to send a sidelink synchronization signal (SLSS) and the reserved time unit; or if the first terminal device operates in a time division duplex (TDD) mode and a system frame includes a reserved time unit, the first time unit set includes all time units in the system frame except a time unit used to send a sidelink synchronization signal (SLSS), a downlink time unit and a special time unit that are in the TDD mode, and the reserved time unit.

Specifically, in the 5G NR scenario, different subcarrier spacings are corresponding to different frame structures, that is, different subcarrier spacings are corresponding to different first time unit sets.

It should also be understood that the first terminal device does not particularly mean one terminal device.

With reference to the first aspect, in some implementations of the first aspect, before the first terminal device determines the first time unit from the first time unit set, the communication method further includes: The first terminal device receives semi-persistent scheduling (SPS) information from a network device, where the SPS information indicates that the first time unit in the first time unit set is used to send the periodic data, the SPS information includes an SPS period $P_{SPS}$, and $P_{SPS}$ is used to determine the first time domain interval. Specifically, the first time domain interval $P_{SPS}$ is expressed as a result that is obtained after a rounding operation is performed on a product of a quantity $S_{symbol}$ of time units available for sidelink communication transmission in one frame structure period and a quantity of system frames included in the SPS period $P_{SPS}$. A time domain interval between the $M^{th}$ time unit in the second time unit set and the first time unit is M first time domain intervals, and M is a positive integer less than or equal to N−1.

According to the communication method provided in this embodiment of this application, the first terminal device may learn, based on the SPS information sent by the network device, that the periodic data is to be sent in the first time unit in the first time unit set. In addition, because the SPS information sent by the network device carries the SPS period, the first terminal device can further determine, from the first time unit set based on the quantity of system frames included in the SPS period $P_{SPS}$ and $S_{symbol}$ that are known to the first terminal device and the SPS period, the second time unit set used to send the periodic data.

It should be understood that N is a predefined value. Optionally, the value may be equal to a value of the first time domain interval.

With reference to the first aspect, in some implementations of the first aspect, the quantity of system frames included in the period $P_{SPS}$ is expressed as a ratio between the period $P_{SPS}$ and a total quantity $N_{symbol}$ of time units in the frame structure period, the first time domain interval $P_{SPS}$ is expressed as $P_{SPS}=[S_{symbol} \times P_{SPS}/N_{symbol}]$, where [ ] represents a rounding up or rounding down operation.

According to the communication method provided in this embodiment of this application, the first time domain interval may be expressed by using the expression $P_{SPS}=[S_{symbol} \times P_{SPS}/N_{symbol}]$. In this case, the time domain interval between the first time unit and the $M^{th}$ time unit that is in the second time unit set may be expressed by using an expression $M \times P_{SPS}$.

With reference to the first aspect, in some implementations of the first aspect, that the first terminal device determines a first time unit from the first time unit set includes: The first terminal device determines historical periodic data that is sent in a third time unit set; the first terminal device determines at least one time unit that is in a fourth time unit set and that is reserved for the historical periodic data; and the first terminal device determines the first time unit from a remaining time unit, where the remaining time unit is a time unit that is left in the fourth time unit set after a time unit that satisfies a preset time relationship with the at least one time unit reserved for the historical periodic data is excluded. The periodic data arrives in a third time unit, the third time unit set includes P time units before the third time unit, P is a positive integer, the third time unit set is a subset of the first time unit set, the fourth time unit set is a subset of the first time unit set, a start time unit in the fourth time unit set is later than the third time unit, and the P time units are consecutively numbered from n'-P to n'-1. n' includes the following: When the third time unit is a time unit in the first time unit set, n' is a number of the third time unit in the first time unit set; or when the third time unit is not a time unit in the first time unit set, n' is a number of the $1^{st}$ time unit that belongs to the first time unit set and that is after the third time unit.

According to the communication method provided in this embodiment of this application, the first terminal device may independently determine, by detecting the historical periodic data that is sent in the plurality of time units and that is present before the periodic data arrives, whether there is a time unit that is in the fourth time unit set and that satisfies a preset relationship with the time unit reserved for the historical periodic data, exclude the time unit that is in the fourth time unit set and that satisfies the preset relationship with the time unit reserved for the historical periodic data (that is, exclude the time unit that cannot be used to send the periodic data), and select the first time unit from the remaining time unit in the fourth time unit set. In other words, in the communication method provided in this embodiment of this application, the first terminal device can independently determine the first time unit that is in the first time unit set and that is used to send the periodic data, without configuration performed by the network device.

It should be understood that, the selecting, by the first terminal device, the first time unit from the remaining time unit in the fourth time unit set may be: selecting any time unit as the first time unit; or calculating an average energy value for the remaining time unit, and selecting a time unit corresponding to relatively low average energy as the first time unit.

It should also be understood that, the at least one time unit reserved for the historical periodic data in this embodiment of this application is the reserved time unit that needs to be determined by the first terminal device for the historical periodic data when the historical periodic data arrives at the first terminal device, because the data is periodic. Theoretically, the reserved time unit can be used to transmit only the historical periodic data without other data. To be specific, if the fourth time unit set includes at least one time unit in the reserved time unit, the at least one time unit cannot be used to transmit the periodic data that is received by the first terminal device in the third time unit. However, whether content of the historical periodic data changes is not limited in this application. In other words, data transmitted in the at least one time unit reserved for the historical periodic data may still be the historical periodic data, or may be data obtained after the historical periodic data changes.

In a possible implementation, for the P time units, $P=P_N \times S_{symbol}$, where $P_N$ is a positive integer, $S_{symbol}$ represents the quantity of time units available for sidelink communication transmission in one frame structure period, and the $P_N \times S_{symbol}$ time units are consecutively numbered from $n'-P_N \times S_{symbol}$ to $n'-1$. A specific value of $P_N$ may be configured by the network device for the first terminal device by using higher layer signaling, or may be predefined in a protocol. This is not limited in this application. For example, if the higher layer signaling indicates that $P_N$ is 100, the third time unit set includes $100 \times S_{symbol}$ time units before the third time unit, where the $100 \times S_{symbol}$ time units are sequentially numbered from $n'-100 \times S_{symbol}$ to $n'-1$.

In another possible implementation, P is configured by using higher layer signaling or is preconfigured. For example, a protocol specifies that P=200.

With reference to the first aspect, in some implementations of the first aspect, that the first terminal device determines historical periodic data that is sent in a third time unit set includes: The first terminal device determines first historical periodic data that is to be sent by the first terminal device in a fourth time unit in the third time unit set. That the first terminal device determines at least one time unit that is in a fourth time unit set and that is reserved for the historical periodic data includes: The first terminal device determines at least one time unit that is in the fourth time unit set and that is reserved for the first historical periodic data.

According to the communication method provided in this embodiment of this application, when removing, from the fourth time unit set, the time unit that cannot be used to send the periodic data, the first terminal device needs to consider the time unit reserved for the historical periodic data that is sent by the first terminal device in the time unit in the third time unit set, and needs to exclude, from the fourth time unit set, a time unit that satisfies a preset relationship with the time unit reserved for the first historical periodic data sent by the first terminal device.

With reference to the first aspect, in some implementations of the first aspect, the remaining time unit includes: a time unit that is left in the fourth time unit set after a time unit that satisfies a first preset time relationship with the at least one time unit reserved for the first historical periodic data is excluded, where the first preset time relationship is that there is a natural number j that makes the following equation hold true:

$$y+j \times [S_{symbol} \times P_{rsvp\_TX}/N_{symbol}] = z+q \times [S_{symbol}], \text{ where}$$

$z+q \times [S_{symbol} \times P''_{rsvp\_TX}/N_{symbol}]$ represents a number of the at least one time unit reserved for the first historical periodic data, z is a number of the fourth time unit, q is a positive integer less than or equal to $Q_1$, y is a number of the time unit that satisfies the first preset time relationship with the at least one time unit reserved for the first historical periodic data, j is a natural number less than or equal to $C_{resel-1}$, $C_{resel}$ is the reservation quantity of the periodic data, $N_{symbol}$ represents a total quantity of time units in one frame structure period in a preset frame structure configuration, $S_{symbol}$ represents a quantity of time units available for sidelink communication transmission in one frame structure period, $P_{rsvp\_TX}$ represents a reservation period of the periodic data, the reservation period of the periodic data is measured in time units, $P''_{rsvp\_TX}$ represents a reservation period of the first historical periodic data, the reservation period of the first historical periodic data is measured in time units, and [ ] represents a rounding up or rounding down operation. When $P''_{rsvp\_TX}/(K*N_{symbol}) < 1$ and $n'-z \leq [S_{symbol} \times P''_{rsvp\_TX}/N_{symbol}]$, $Q_1 = K/(P''_{rsvp\_TX}/N_{symbol})$; otherwise, $Q_1 = 1$. K is a preconfigured positive integer, K is a positive integer indicated by higher layer signaling, or K is a positive integer indicated dynamically. It should be understood that a value of K can restrict a possibility that q is equal to 1. A larger value of K indicates a smaller possibility that q is equal to 1.

According to the communication method provided in this embodiment of this application, there is a natural number j in the time unit that is in the fourth time unit in the third time unit set and that is reserved for the data that is sent by the first terminal device and the time unit that needs to be excluded from the fourth time unit set, so that the time unit numbered y makes the following equation hold true:

$$y+j \times [S_{symbol} \times P_{rsvp\_TX}/N_{symbol}] = z+q \times [S_{symbol} \times P''_{rsvp\_TX}/N_{symbol}]$$

It should be understood that in this application, the first preset time relationship means that there is a natural number j that makes the equation hold true, and in this case, the time unit that is in the fourth time unit set and that is corresponding to y in the equation needs to be excluded.

It should be understood that a reservation period of data in this application is measured in time units.

It should also be understood that if the third time unit set does not include the time unit used by the first terminal device to send the first historical periodic data, the foregoing operation of excluding, from the fourth time unit set, the time unit that satisfies the first preset time relationship with the time unit reserved for the historical periodic data sent by the first terminal device.

With reference to the first aspect, in some implementations of the first aspect, that the first terminal device determines historical periodic data that is sent in a third time unit set includes: The first terminal device obtains, through monitoring, sidelink control information (SCI) from a second terminal device, where the SCI is used to indicate second historical periodic data of the second terminal device; and the first terminal device decodes the SCI to obtain a reservation period $P_{rsvp\_RX}$ and a priority $prio_{RX}$ that are of the second historical periodic data, where $P_{rsvp\_RX}$ and $prio_{RX}$ are used to determine a threshold $Th_{prioTX,prioRX}$, and the second terminal device is a terminal device other than the first terminal device. That the first terminal device determines at least one time unit that is in a fourth time unit set and that is reserved for the historical periodic data includes: The first terminal device determines that a measurement result of reference signal received power (RSRP) of the second historical periodic data in a fifth time unit in the third time unit set is greater than $Th_{prioTX,prioRX}$, and the first terminal device determines at least one time unit that is in the fourth time unit set and that is reserved for the second historical periodic data.

According to the communication method provided in this embodiment of this application, when removing, from the fourth time unit set, the time unit that cannot be used to send the periodic data, the first terminal device further needs to consider a time unit reserved for historical periodic data that is sent by another terminal device in a time unit in the third time unit set, and excludes, from the fourth time unit set, a time unit that satisfies a preset formula with the time unit reserved for the historical periodic data sent by the another terminal device.

It should be understood that if a proportion of the remaining time unit in the fourth time unit set to a total quantity of time units in the fourth time unit set is less than 20%, a value of the threshold $Th_{prioTX,prioRX}$ needs to be adjusted, until the proportion of the remaining time unit in the fourth time unit set to the total quantity of time units in the fourth time unit set is greater than or equal to 20%.

It should also be understood that the second terminal device does not particularly mean one terminal device, and may be one or more terminal devices other than the first terminal device. It can be understood that the first terminal device may determine, through monitoring, whether the at least one other terminal device has sent historical periodic data in the third time unit set, and whether a time unit reserved for the historical periodic data is included in the fourth time unit set.

With reference to the first aspect, in some implementations of the first aspect, the remaining time unit includes: a time unit that is left in the fourth time unit set after a time unit that satisfies a second preset time relationship with the at least one time unit reserved for the second historical periodic data is excluded, where the second preset time relationship is that there is a natural number j that makes the following equation hold true:

$$y'+j\times[S_{symbol}\times P_{rsvp\_TX}/N_{symbol}]=z'+q\times[S_{symbol}\times P_{rsvp\_RX}/N_{symbol}], \text{ where}$$

$z'+q\times[S_{symbol}\times P_{rsvp\_RX}/N_{symbol}]$ represents a number of the at least one time unit reserved for the second historical periodic data, z' is a number of the fifth time unit, q is a positive integer less than or equal to $Q_2$, y' is a number of the time unit that satisfies the second preset time relationship with the at least one time unit reserved for the second historical periodic data, j is a natural number less than or equal to $C_{resel-1}$, $C_{resel}$ is the reservation quantity of the periodic data, $S_{symbol}$ represents the quantity of time units available for sidelink communication transmission in one frame structure period, $N_{symbol}$ represents the total quantity of time units in one frame structure period, $P_{rsvp\_TX}$ represents the reservation period of the periodic data, the reservation period of the periodic data is measured in time units, $P_{rsvp\_RX}$ represents the reservation period of the second historical periodic data, the reservation period of the second historical periodic data is measured in time units, and [ ] represents a rounding up or rounding down operation. When $P_{rsvp\_RX}/(K*N_{symbol})<1$ and $n'-z'\leq N_{symbol}\times P_{rsvp\_RX}$, $Q_2=K/(P_{rsvp\_RX}/N_{symbol})$; otherwise, $Q_2=1$. k is a preconfigured positive integer, K is a positive integer indicated by higher layer signaling, or K is a positive integer indicated dynamically.

According to the communication method provided in this embodiment of this application, there is a natural number j in the time unit that is in the fifth time unit in the third time unit set and that is reserved for the data that is to be sent by another second terminal device and the time unit that needs to be excluded from the fourth time unit set, so that the time unit that is numbered y' and that needs to be excluded makes the following equation hold true:

$$y'+j\times[S_{symbol}\times P_{rsvp\_TX}/N_{symbol}]=z'+q\times[S_{symbol}\times P_{rsvp\_Rx}/N_{symbol}]$$

It should be understood that in this application, the second preset time relationship means that there is a natural number j that makes the equation hold true, and in this case, the time unit that is in the fourth time unit set and that is corresponding to y in the equation needs to be excluded.

With reference to the first aspect, in some implementations of the first aspect, the first time domain interval $P_{rsvp\_TX}$ is expressed as a product of the quantity $S_{symbol}$ of time units available for sidelink communication transmission in one frame structure period and a quantity of system frames included in the reservation period $P_{rsvp\_TX}$ of the periodic data; and a time domain interval between the $M^{th}$ time unit in the second time unit set and the first time unit is M first time domain intervals, and M is a positive integer less than or equal to N−1.

According to the communication method provided in this embodiment of this application, after determining the first time unit from the fourth time unit set, the first terminal device may determine the second time unit set based on a time domain interval relationship between the first time unit and a time unit that is in the second time unit set. Then, the periodic data is sent in the first time unit and the second time unit set.

With reference to the first aspect, in some implementations of the first aspect, if the quantity of system frames included in the reservation period $P_{rsvp\_TX}$ of the periodic data is expressed as a ratio between the reservation period $P_{rsvp\_TX}$ of the periodic data and the total quantity $N_{symbol}$ of time units in the frame structure period, the first time domain interval $P_{rsvp\_TX}$ is expressed as $P_{rsvp\_TX}=[S_{symbol}\times P_{rsvp\_TX}/N_{symbol}]$, where [ ] represents a rounding up or rounding down operation.

According to the communication method provided in this embodiment of this application, the first time domain interval may be expressed by using the expression $P_{rsvp\_TX}=[S_{symbol}\times P_{rsvp\_TX}/N_{symbol}]$. In this case, the time domain interval between the first time unit and the $M^{th}$ time unit that is in the second time unit set may be expressed by using an expression $M\times P_{rsvp\_TX}$.

It should be understood that if the third time unit set does not include the time unit used by the second terminal device to send the historical periodic data, the foregoing operation of excluding, from the fourth time unit set, the time unit that satisfies the second preset time relationship with the time unit reserved for the historical periodic data sent by the second terminal device.

According to a second aspect, a communication method is provided. The method includes: A network device determines semi-persistent scheduling (SPS) information, where the SPS information is used to indicate that a first time unit in a first time unit set is available for a first terminal device to send periodic data, where the SPS information includes an SPS period $P_{SPS}$, $P_{SPS}$ is used to determine a first time domain interval, and the first time domain interval $P_{SPS}$ is expressed as a product of a quantity $S_{symbol}$ of time units available for sidelink communication transmission in one frame structure period and a quantity of system frames included in the SPS period $P_{SPS}$; a time unit in the first time unit set is available for transmitting at least one of sidelink service data, sidelink control information, and sidelink feedback information, the first time unit set includes a plurality of time units, and the plurality of time units are consecutively numbered in a time sequence; and the first time domain interval and a reservation quantity N are used to determine a second time unit set from the first time unit set, a time unit in the second time unit set is used by the first terminal device to send the periodic data, the second time unit set includes N−1 time units, a time domain interval between the $1^{st}$ time unit in the second time unit set and the first time unit is the first time domain interval, a time domain interval between any two adjacent time units in the second time unit set is the first time domain interval, and a number of a time unit in the second time unit set is greater than that of the first time unit. The network device sends the SPS information to the first terminal device.

According to the communication method provided in this embodiment of this application, the network device sends the SPS information to the first terminal device, indicating that the first time unit in the first time unit set is available for the first terminal device to send the periodic data. In addition, because the SPS information sent by the network device carries the SPS period, the first terminal device can further determine, from the first time unit set based on the quantity of system frames included in the SPS period $P_{SPS}$ and $S_{symbol}$ that are known to the first terminal device and the SPS period, the second time unit set used to send the periodic data.

With reference to the second aspect, in some implementations of the second aspect, the quantity of system frames included in the period $P_{SPS}$ is expressed as a ratio between the period $P_{SPS}$ and a total quantity $N_{symbol}$ of time units in the frame structure period, the first time domain interval $P_{SPS}$ is expressed as $P_{SPS}=[S_{symbol} \times P_{SPS}/N_{symbol}]$, where [ ] represents a rounding up or rounding down operation.

According to the communication method provided in this embodiment of this application, the first time domain interval may be expressed by using the expression $P_{SPS}=[S_{symbol} \times P_{SPS}/N_{symbol}]$. In this case, a time domain interval between the first time unit and the $M^{th}$ time unit that is in the second time unit set may be expressed by using an expression $M \times P_{SPS}$.

With reference to the second aspect, in some implementations of the second aspect, a time domain interval between the $M^{th}$ time unit in the second time unit set and the first time unit is M first time domain intervals, and M is a positive integer less than or equal to N−1.

According to the communication method provided in this embodiment of this application, a time domain interval between the first time unit and a time unit that is in the second time unit set satisfies a specific relationship, and the second time unit set can be determined based on the first time unit. Then, the periodic data is sent in the first time unit and the second time unit set.

According to a third aspect, a communications apparatus is provided. The apparatus may be configured to perform operations of the first terminal device in any one of the first aspect or the possible implementations of the first aspect. Specifically, the communications apparatus includes corresponding components (means) configured to perform steps or functions described in the first aspect, and may be the first terminal device in the first aspect or a chip or a functional module inside the first terminal device. The steps or functions may be implemented by software, hardware, or a combination of hardware and software.

According to a fourth aspect, a communications apparatus is provided. The apparatus may be configured to perform operations of the network device in any one of the second aspect or the possible implementations of the second aspect. Specifically, the communications apparatus may include corresponding components (means) configured to perform steps or functions described in the second aspect, and may be the network device in the second aspect or a chip or a functional module inside the network device. The steps or functions may be implemented by software, hardware, or a combination of hardware and software.

According to a fifth aspect, a communications device is provided, including a processor, a transceiver, and a memory. The memory is configured to store a computer program. The transceiver is configured to perform receiving and sending steps in the communication method in any one of the first aspect or the possible implementations of the first aspect, or in any one of the second aspect or the possible implementations of the second aspect. The processor is configured to invoke the computer program from the memory and run the computer program, so that the communications device performs the communication method in any one of the first aspect or the possible implementations of the first aspect, or in any one of the second aspect or the possible implementations of the second aspect.

Optionally, there are one or more processors, and there are one or more memories.

Optionally, the memory may be integrated with the processor, or the memory and the processor are disposed separately.

Optionally, the transceiver includes a transmitter (transmitter) and a receiver (receiver).

In a possible design, a communications device is provided, including a transceiver, a processor, and a memory. The processor is configured to control the transceiver to receive/send a signal. The memory is configured to store a computer program. The processor is configured to invoke the computer program from the memory and run the computer program, so that the communications device performs the method in any one of the first aspect or the possible implementations of the first aspect.

In another possible design, a communications device is provided, including a transceiver, a processor, and a memory. The processor is configured to control the transceiver to receive/send a signal. The memory is configured to store a computer program. The processor is configured to invoke the computer program from the memory and run the computer program, so that the communications device performs the method in any one of the second aspect or the possible implementations of the second aspect.

According to a sixth aspect, a system is provided. The system includes the communications apparatuses provided in the third aspect and the fourth aspect.

According to a seventh aspect, a computer program product is provided. The computer program product includes a computer program (which may also be referred to as code or instructions). When the computer program is run, a computer is enabled to perform the method in any one of the first aspect or the possible implementations of the first aspect, or in any one of the second aspect or the possible implementations of the second aspect.

According to an eighth aspect, a computer-readable medium is provided. The computer-readable medium stores a computer program (which may also be referred to as code or instructions). When the computer program is run on a computer, the computer is enabled to perform the method in any one of the first aspect or the possible implementations of the first aspect, or in any one of the second aspect or the possible implementations of the second aspect.

According to a ninth aspect, a chip is provided, including a memory and a processor. The memory is configured to store a computer program. The processor is configured to invoke the computer program from the memory and run the computer program, so that a communications device installed with the chip system performs the method in any one of the first aspect or the possible implementations of the first aspect, or in any one of the second aspect or the possible implementations of the second aspect.

DETAILED DESCRIPTION OF ILLUSTRATIVE EMBODIMENTS

Figure 1:
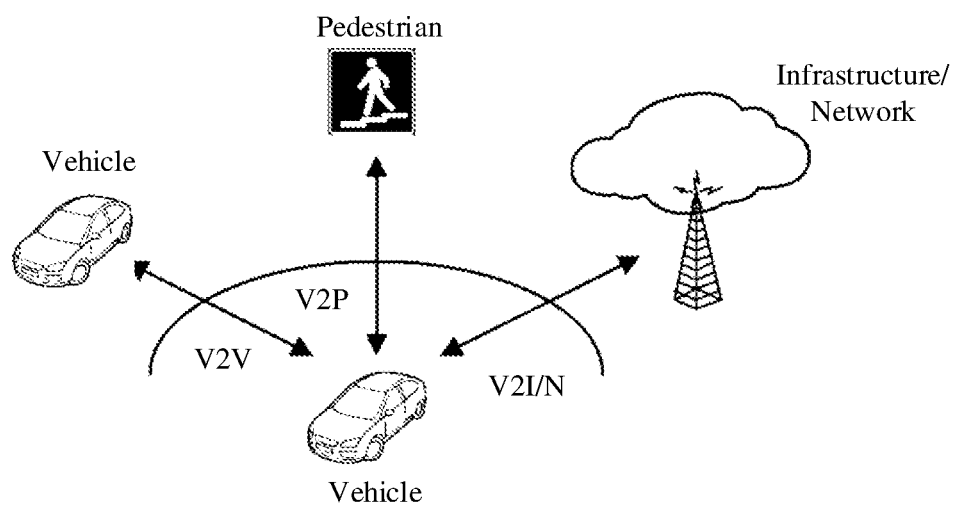
FIG. 1 is a schematic diagram of a V2X system in a current technology.

The following describes technical solutions of this application with reference to the accompanying drawings.

The technical solutions of the embodiments of this application may be used in various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system.

The first terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The first terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with a first terminal device. The network device may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the first terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software. Moreover, in the embodiments of this application, a specific structure of an entity for performing a method provided in the embodiments of this application is not particularly limited, provided that a program that records code for performing the method provided in the embodiments of this application can be run, to perform communication according to the method provided in the embodiments of this application. For example, the entity for performing the method provided in the embodiments of this application may be the first terminal device or the network device, or may be a functional module, in the first terminal device or the network device, that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk drive, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

With development of wireless communications technologies, people's requirements for high data rates and user experience are increasing, and people's requirements for nearby services that enable people to understand and communicate with a surrounding person or thing gradually increase. Therefore, a device-to-device (D2D) communications technology emerges accordingly. Application of the D2D communications technology can reduce load of cellular networks, reduce battery power consumption of terminal devices, increase data rates, and satisfy requirements for the nearby services in a desirable manner. The D2D communications technology allows a plurality of terminal devices in support of D2D functions to perform direct discovery and direct communication with or without a network infrastructure. In view of features and advantages of the D2D communications technology, an application scenario of an internet of vehicles based on the D2D communications technology is proposed. However, in consideration of security, a latency requirement is quite high in this scenario, and an existing D2D communications technology cannot satisfy such a high latency requirement.

Then, based on the LTE system proposed by the 3rd Generation Partnership Project (3GPP), an internet of vehicles technology for vehicle-to-everything (V2X) communication (X represents anything) is proposed. Communication modes in a V2X system are collectively referred to as V2X communication. For example, the V2X communication includes vehicle-to-vehicle (V2V) communication, vehicle-to-infrastructure (V2I) communication, vehicle-to-pedestrian (V2P) communication, and vehicle-to-network (V2N) communication. Communication between terminal devices in the V2X system is widely referred to as sidelink (SL) communication.

At present, a vehicle can obtain road condition information or receive service information in time in a V2V, V2I, V2P, or V2N communication mode, and these communication modes may be collectively referred to as V2X communication. FIG. 1 is a schematic diagram of a V2X system in a current technology. V2V communication, V2P communication, and V2I/N communication are included in the schematic diagram.

The V2X communication is intended for high-speed devices representative of vehicles, and is a basic technology and key technology to be used in future scenarios that have a quite high latency requirement in communication, such as intelligent car, autonomous driving, and intelligent transportation system scenarios.

As shown in FIG. 1, vehicles communicate with each other through V2V. A vehicle may broadcast, to surrounding vehicles, information such as a speed, a driving direction, and a specific location that are of the vehicle, and whether an emergency brake is put on. By obtaining the information, drivers of the surrounding vehicles can better learn about traffic conditions beyond a line of sight, to prejudge and further evade a dangerous situation. The vehicle communicates with a roadside infrastructure through V2I, and the roadside infrastructure can provide the vehicle with various types of service information and data network access. Functions such as electronic toll collection and in-car entertainment greatly improve traffic intelligence. The roadside infrastructure, for example, a roadside unit (RSU), includes two types. One type is an RSU of a terminal device type. Because RSUs are distributed on a roadside, the RSU of the terminal device type is in an immobile state, and mobility does not need to be considered. The other type is an RSU of a network device type. The RSU of the network device type can provide timing synchronization and resource scheduling for a vehicle communicating with a network device. A vehicles and a person (for example, a vehicle and a pedestrian, a vehicle and bicyclist, a vehicle and a driver, or a vehicle and a passenger) communicate with each other through V2P. A vehicle communicates with a network through V2N. The V2N and the V2I may be collectively referred to as V2I/N.

Figure 2:
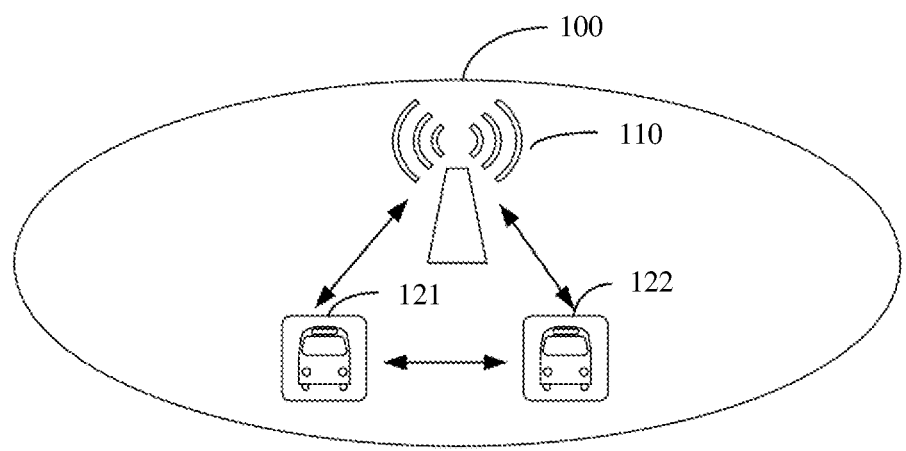
FIG. 2 is a schematic block diagram of a communications system to which an embodiment of this application is applicable.

It should be understood that FIG. 1 is merely an example schematic diagram for introducing the V2X system, and does not constitute any limitation on this application. For example, quantities of vehicles, pedestrians, and infrastructures each may be more than one, but not the quantities shown in FIG. 1. FIG. 1 briefly describes the V2X system in the current technology. With reference to FIG. 2, the following briefly describes scenarios to which implementations provided in this application are applicable.

FIG. 2 is a schematic block diagram of a communications system to which an embodiment of this application is applicable. As shown in FIG. 2, in the communications system 100, before data transmission is performed, a terminal device 121 and a network device no may determine, through signaling interaction, a resource used to transmit data with a terminal device 122, and then the terminal device 121 communicates with the terminal device 122 by using the determined resource. Alternatively, before data transmission is performed, the terminal device 122 and the network device no may determine, through signaling interaction, a resource used to transmit data with the terminal device 121, and then the terminal device 122 communicates with the terminal device 121 by using the determined resource. In other words, this embodiment of this application is used in an application scenario of sidelink data transmission.

It should be understood that FIG. 2 is merely a schematic diagram, and does not constitute any limitation on the protection scope of this application. For example, the quantity of terminal devices shown in FIG. 2 is merely used as an example.

It should also be understood that communication between terminal devices involved in the V2X system is referred to as sidelink communication in this application, but does not constitute any limitation on this application. For example, sidelink communication may also be referred to as side-link communication, straight-through link communication, or secondary link communication. In addition, sidelink communication is not limited to be used in the V2X system, and communication between terminal devices in other scenarios may also be referred to as sidelink communication.

FIG. 2 describes the scenarios to which this embodiment of this application can be used. For ease of understanding the technical solutions of this application, the following briefly describes several basic concepts in the technical solutions of this application.

1. Frame Structure

The following content of this application mainly relates to an LTE frame structure and a 5G NR frame structure. It should be understood that the LTE frame structure and the 5G NR frame structure have been defined in detail in existing protocols, and definitions of the LTE frame structure and the 5G NR frame structure in the existing protocols are readily and directly used in this application. Therefore, the frame structures are merely described briefly in this application. For related content, refer to stipulations in the existing protocols. A specific LTE frame structure and a specific 5G NR frame structure are not detailed in this application.

(1) LTE Frame Structure

Two types of different duplex modes are included in LTE. A most direct difference between different duplex modes lies in their impact on an air interface radio frame structure. In FDD, frequencies are used to distinguish between uplink and downlink, and resources in one direction are continuous in terms of time. In TDD, time is used to distinguish between uplink and downlink, resources in one direction are discontinuous in terms of time, and a guard period is needed to avoid receiving and sending interference between two directions. Therefore, in LTE, frame structures are respectively designed for FDD and TDD.

In LTE, to satisfy requirements of uplink and downlink time conversion in the TDD mode, the following special frame structure is designed:

A radio frame structure is used, in which a radio frame is 10 ms in duration and includes two half-frames each with duration of 5 ms; and each half-frame includes five subframes each with duration of 1 ms: four common subframes and one special subframe. Therefore, it can also be understood that the entire frame is divided into 10 subframes each with duration of 1 ms, which are used as data scheduling and transmission units (that is, TTIs). The special subframe includes three parts: a downlink pilot timeslot (DwPTS), a guard period (GP), and an uplink pilot timeslot (UpPTS). The DwPTS is used to transmit a downlink reference signal, or is available for transmitting some control information. The UpPTS is available for transmitting information about some short random access channels (RACH) and sounding reference signals (SRS). The GP is a guard period between uplink and downlink.

An LTE FDD radio frame is 10 ms in duration. Each frame includes 10 subframes or 20 slots. Each subframe includes two slots, and each slot is 0.5 ms in duration. Each slot in LTE may be corresponding to several physical resource blocks (PRBs), and each PRB includes a plurality of subcarriers.

(2) 5G NR Frame Structure

Compared with LTE (a subcarrier spacing and a symbol length) (in LTE, there is only a type of subcarrier spacing of 15 kHz), 5G NR supports a plurality of types of subcarrier spacings. Other content is similar to that of the foregoing LTE frame structure. Details are not described herein again.

2. LTE V2X

LTE V2X is a V2X communications technology based on a mobile cellular network, like a mobile phone is connected to a 3G/4G network. Two communication modes are defined in LTE V2X for vehicle applications: centralized and distributed modes. The centralized mode is also referred to as a cellular mode, requiring a base station as a control center. The distributed mode is also referred to as a straight-through mode, without requiring support of a base station.

3. LTE V2X Resource Configuration

LTE V2X communication in an existing protocol can support communication scenarios with and without network coverage. Resource configuration modes of LTE V2X communication may use a network device allocation mode and a terminal device self-selection mode. Specifically, in an LTE V2X communications system, the network device allocation mode is a mode 3 defined in the LTE protocol standard, which is referred to as an LTE mode 3 for short below; and the terminal device self-selection mode is a mode 4 defined in the LTE protocol standard, which is referred to as an LTE mode 4 for short below. The network device allocation mode is mainly used in V2X communication in a case in which there is network coverage. A network device performs centralized resource configuration based on reporting statuses of buffer state reports (buffer state report, BSR) of terminal devices. A scheduling mode in which the network device performs resource allocation may be a semi-persistent scheduling (SPS) mode or a dynamic scheduling mode. The SPS scheduling mode may be used for periodic data of a terminal device. The SPS mode and the dynamic scheduling mode are prior-art scheduling modes, and can be directly used in this application. Details are not described herein.

The terminal device self-selection mode is mainly used in V2X communication in a case in which there is no network coverage. Because no network device manages resources together, a V2X terminal device can only select a communication resource for V2X communication. However, to reduce a probability that the V2X terminal device selects at least a partially same communication resource as another V2X terminal device and cause a resource selection collision, a manner based on historical monitoring information is used.

Whether a potential available resource is occupied by another terminal device is determined based on historical information. If the potential available resource is occupied by a terminal device, whether scheduling assignment (SA) information of the terminal device can be decoded to obtain some characteristic information of the terminal device, such as a priority and a resource reservation status of the terminal device, is further determined. Then, whether the potential available resource will still be occupied by the terminal device in a future resource selection time window is predetermined, and an available resource is selected from the future resource selection time window, for V2X transmission.

For the mode 3 and the mode 4, a subframe set ($t_0^{SL}$, $t_1^{SL}$, ..., $t_{max}^{SL}$) used for physical sidelink shared channel (physical sidelink shared channel, PSSCH) transmission is defined in LTE. Specifically, the PSSCH in this application may also be referred to as sidelink service data. For each subframe in the subframe set, $0<t_i^{SL}<10240$ holds true, where i is a number of each subframe, i=0, 1, ..., and max, and 10240 represents a total quantity of subframes in a system frame. In addition, the following subframes need to be excluded from the subframe set used for PSSCH transmission: (1) a subframe used for sidelink synchronization signal transmission; (2) a downlink subframe and a special subframe in a TDD mode; and (3) a reserved subframe.

The ultimate subframe set ($t_0^{SL}$, $t_1^{SL}$, ..., $t_{max}^{SL}$) used for PSSCH transmission includes remaining subframes that are left after the subframes shown in the foregoing three cases (1), (2), and (3) are excluded from total subframes in a system frame. Specifically, subframes in the subframe set are the remaining subframes that are consecutively numbered in a time sequence.

For example, 100 subframes are left after the subframe used for sidelink synchronization signal transmission, the downlink subframe and the special subframe in the TDD mode, and the reserved subframe are excluded from total subframes in a system frame. In this case, the subframe set used for PSSCH transmission includes the remaining 100 subframes, and the 100 subframes in the subframe set used for PSSCH transmission are sequentially numbered starting from 0. Specifically, the 100 subframes in the subframe set used for PSSCH transmission are sorted in ascending order of numbers to obtain: $t_0^{SL}$, $t_1^{SL}$, ..., $t_{98}^{SL}$, $t_{99}^{SL}$.

For example, in the LTE mode 3, it is assumed that a current resource configuration mode is an SPS mode based on the network device that performs periodic scheduling. When the subframe set corresponding to a time-frequency resource used for PSSCH transmission is ($t_0^{SL}$, $t_1^{SL}$, ..., $t_{max}^{SL}$), if the network device allocates, at a start moment of a subframe $t_m^{SL}$, a time-frequency resource block to a terminal device in the SPS state to perform PSSCH transmission in the subframe $t_m^{SL}$, the terminal device may use the same time-frequency resource for PSSCH transmission in a subframe $t_{m+j\times P_{SPS}}^{SL}$. Herein, j=1, 2, . . . , and $P_{SPS}=P_{step}\times P_{SPS}/100$, where $P_{SPS}$ represents an SPS configuration period, and a value of $P_{step}$ is related to an LTE frame structure. $P_{step}$ is specifically defined in Table 1:

TABLE 1

Correspondence table between $P_{step}$ and a frame structure

| Frame structure | $P_{step}$ | Quantity of subframes | | | | | | | | | |
|---|---|---|---|---|---|---|---|---|---|---|---|
| | | 0 | 1 | 2 | 3 | 4 | 5 | 6 | 7 | 8 | 9 |
| TDD configuration 0 | 60 | D | S | U | U | U | D | S | U | U | U |
| TDD configuration 1 | 40 | D | S | U | U | D | D | S | U | U | D |
| TDD configuration 2 | 20 | D | S | U | D | D | D | S | U | D | D |
| TDD configuration 3 | 30 | D | S | U | U | U | D | D | D | D | D |
| TDD configuration 4 | 20 | D | S | U | U | D | D | D | D | D | D |
| TDD configuration 5 | 10 | D | S | U | D | D | D | D | D | D | D |
| TDD configuration 6 | 50 | D | S | U | U | U | D | S | U | U | D |
| FDD | 100 | D/U | D/U | D/U | D/U | D/U | D/U | D/U | D/U | D/U | D/U |

The frame structures in Table 1 are possible existing LTE frame structure forms. D, S, U, and D/U are transmission states of each subframe. An uplink (UL) transmission state is referred to as U for short, a downlink (DL) transmission state is referred to as D for short, a special (S) state is referred to as S for short, and a downlink or uplink (D/U) transmission state is referred to as D/U for short.

Figure 3:
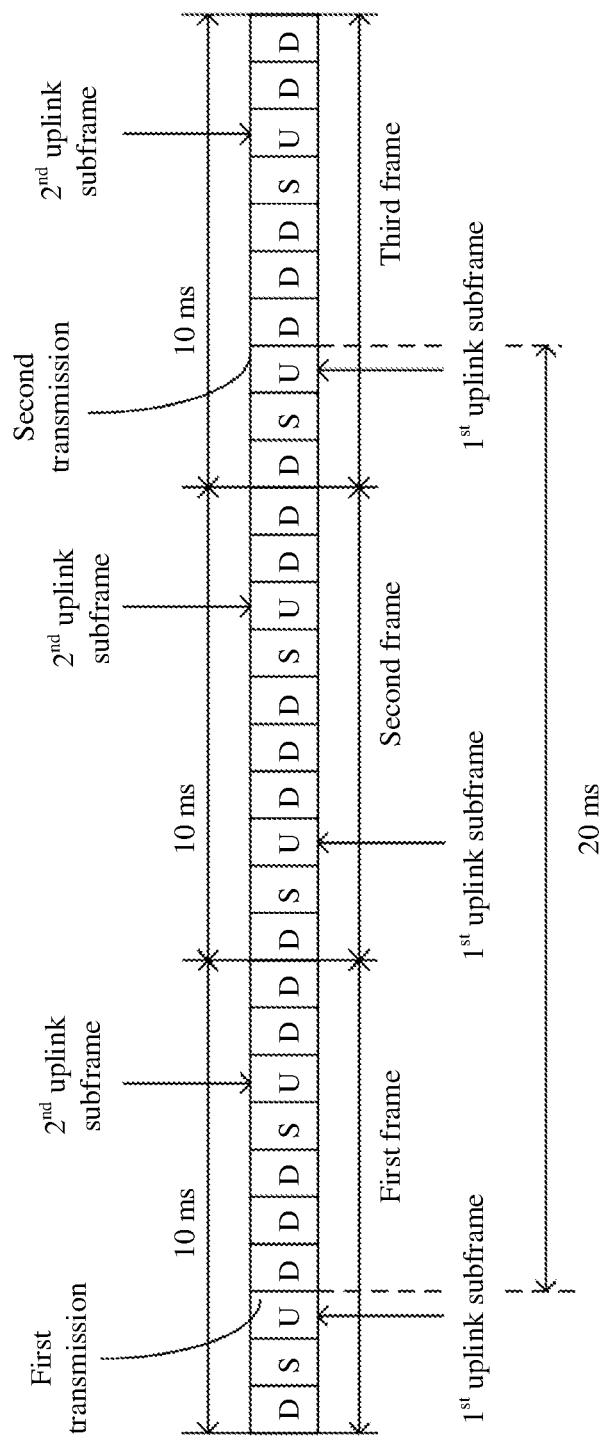
FIG. 3 is a schematic diagram of PSSCH transmission according to an embodiment of this application.

It can be learnt from Table 1 that the value of $P_{step}$ may be considered as a quantity of uplink transmission state subframes in a frame structure configuration multiplied by 10. For example, it can be learnt from Table 1 that, when the frame structure is the TDD configuration 2, the quantity of uplink transmission state subframes is 2, and the value of $P_{step}$ is 2*10=20 in this case. FIG. 3 is a schematic diagram of PSSCH transmission according to an embodiment of this application. Details are as follows:

When a terminal device transmits a PSSCH in the 1st uplink subframe in a first frame for the first time, and an SPS period $P_{SPS}$ is 20 ms, the terminal device transmits a PSSCH in the 1st uplink subframe in a third frame for the second time. FIG. 3 is merely a schematic diagram of an example form, and does not constitute any limitation on this application.

Figure 4:
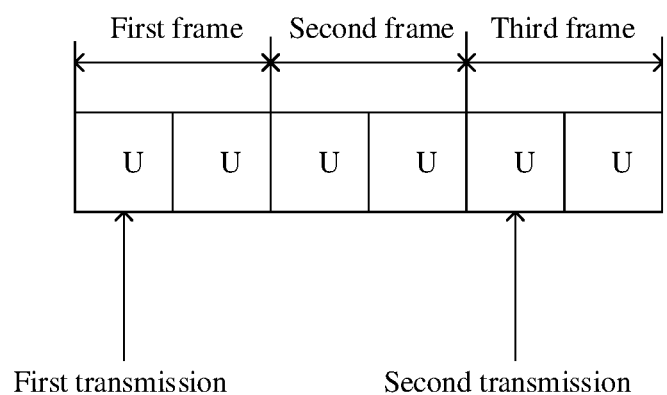
FIG. 4 is a schematic diagram of subframes used for PSSCH transmission according to an embodiment of this application.

According to the definition of the subframe set $(t_0^{SL}, t_1^{SL}, \ldots, t_{max}^{SL})$ used for PSSCH transmission, downlink subframes and special subframes in a frame structure in FIG. 3 are excluded. Assuming that a quantity of reserved subframes is 1, a subframe set used for PSSCH transmission is shown in FIG. 4. FIG. 4 is a schematic diagram of subframes used for PSSCH transmission according to an embodiment of this application.

In FIG. 4, a terminal device transmits a PSSCH in the 1st uplink subframe in a first frame for the first time, and the terminal device transmits a PSSCH in the 1st uplink subframe in a third frame for the second time. An interval between the two subframes in the subframe set $(t_0^{SL}, t_1^{SL}, \ldots t_{max}^{SL})$ used for PSSCH transmission is 4. Calculation is performed by using the following formula to obtain: $P_{SPS}=P_{step}\times P_{SPS}/100=20\times 20/100=4$, where $P_{SPS}=P_{step}\times P_{SPS}/100$ may be construed as a product of a quantity of uplink transmission state subframes in a system frame in a frame structure configuration and a quantity of system frames included in an SPS period $P_{SPS}$.

Figure 5:
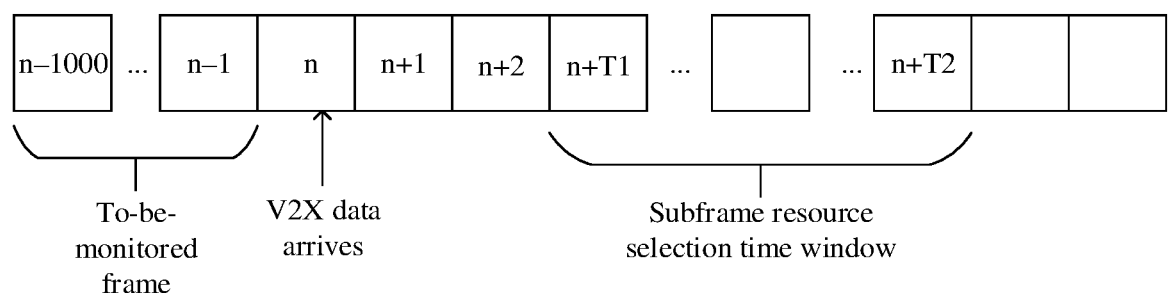
FIG. 5 is a schematic diagram of a subframe set according to an embodiment of this application.

In the LTE mode 4, when the terminal device needs to send a periodic PSSCH, assuming that the periodic PSSCH of the terminal device arrives in a subframe n, the terminal device starts to perform resource selection or resource reselection based on a higher layer signaling configuration. For details, refer to FIG. 5. FIG. 5 is a schematic diagram of a subframe set according to an embodiment of this application. The terminal device views historical monitoring information (a definition of $P_{step}$ is the same as that in Table 1) of $10\times P_{step}$ subframes (which are numbered from $n-10\times P_{step}$ to $n-1$) that are before the subframe n, excludes an unavailable resource from a resource selection time window ([$n+T_1$, $n+T_2$], where $T_1\leq 4$, $20\leq T_2\leq 100$), and randomly selects, from a remaining resource set, an available time-frequency resource block to transmit the PSSCH. Each available resource in the resource selection time window [$n+T_1$, $n+T_2$] is defined as $R_{x,y}$ herein, where y represents a number of a subframe, and x represents a set of continuous time-frequency resources, each of which has a length L.

For the subframe set $(t_0^{SL}, t_1^{SL}, \ldots, t_{max}^{SL})$ in the mode 4, after completing resource exclusion, if a terminal device uses, at a start moment of a subframe $t_m^{SL}$, an available time-frequency resource block to perform PSSCH transmission in the subframe $t_m^{SL}$, the terminal device may use the same time-frequency resource for PSSCH transmission in a subframe $t_{m+j\times P_{rsvp\_TX}}^{SL}$.

j=1, 2, . . . , $C_{resel}-1$ and $P_{rsvp\_TX}=P_{step}\times P_{rsv-TX}/100$, where $P_{rsvp\_TX}$ represents a reservation period of the PSSCH of the terminal device; and the definition of $P_{step}$ is related to a frame structure, is the same as that in Table 1, and is not described herein again. $C_{resel}$ represents a reservation quantity of PSSCHs that need to be transmitted by the terminal device in the mode 4. For example, when the frame structure is the TDD configuration 2 and the reservation period $P_{rsvp\_TX}$ of the PSSCH is 20 ms, as shown in FIG. 3 and FIG. 4, $P_{rsvp\_TX}=20\times 20/100=4$. A physical meaning of $P_{rsvp\_TX}=P_{step}\times P_{rsvp\_TX}/100$ is the same as that of $P'_{SPS}=P_{step}\times P_{SPS}/100$, and is expressed as a product of a quantity of uplink subframes in a system frame in a frame structure configuration and a quantity of system frames included in the reservation period $P_{rsvp\_TX}$ of the PSSCH.

At a moment of a subframe $t_n^{SL}$, the terminal device continuously monitors a subframe that is in a subframe set $(t_{n-10\times P_{step}}^{SL}, t_{n-10\times P_{step}+1}^{SL}, \ldots, $ and $ t_{n-1}^{SL})$ other than a subframe in which the terminal device has sent data. Specific resource exclusion principles are as follows:

(1) It is assumed that the terminal device has sent data is in a subframe $t_z^{SL}$. If there is an integer j that makes $y+j*P_{rsvp\_TX}=z+P_{step}\times q\times k$ hold true, a resource $R_{x,y}$ needs to be excluded, where x indicates a frequency domain location of the resource $R_{x,y}$, and y indicates a time domain location of the resource $R_{x,y}$. It should be understood that determining of the frequency domain location of the resource $R_{x,y}$ is not involved in this application, and therefore exclusion of the resource $R_{x,y}$ can be understood as exclusion of a time unit numbered y. Herein, j=1, 2, . . . , $C_{resel}$-1, where $C_{resel}$ represents the reservation quantity of PSSCHs in the mode 4, $P_{rsvp\_TX}=P_{step}\times P_{rsvp\_TX}/100$, and the definition of $P_{step}$ is related to a frame structure and is the same as that in Table 1. k is configured by using a higher layer parameter: a restrict resource reservation period (restrict resource reservation period), where q=1, 2, . . . Q. When k<1 and n'-z≤$P_{step}\times$k, Q=1/k; otherwise, Q=1. Herein, n' is defined as follows: If $t_n^{SL}$ belongs to the subframe set ($t_0^{SL}$, $t_1^{SL}$, . . . , $t_{max}^{SL}$), $t_{n'}^{SL}$ is $t_n^{SL}$; otherwise, $t_{n'}^{SL}$ is the $1^{st}$ subframe that belongs to the subframe set ($t_0^{SL}$, $t_1^{SL}$, . . . , $t_{max}^{SL}$) and that is after the subframe $t_n^{SL}$.

(2) It is assumed that the terminal device obtains sidelink control information (sidelink control information, SCI) of another terminal device in a subframe $t_z^{SL}$, decodes the SCI to obtain $P_{rsvp\_RX}$ of a PSSCH transmitted by the another terminal device and prio$_{RX}$, and calculates a threshold $Th_{prioTX,prioRX}$ based on $P_{rsvp\_RX}$ and prio$_{RX}$. If a measurement result of reference signal received power (reference signal received power, RSRP) of the PSSCH transmitted by the another terminal device is greater than the threshold $Th_{prioTX,prioRX}$, and there is an integer j that makes y+j×$P_{rsvp\_TX}=z+q\times P_{step}\times P_{rsvp\_RX}$ hold true, the resource $R_{x,y}$ corresponding to the time unit numbered y needs to be excluded. Herein the definition of $P_{rsvp\_TX}$ is the same as that described above, where j=1, 2, . . . , $C_{resel}$-1 and q=1, 2, . . . Q. The definition of $P_{step}$ is related to a frame structure and is the same as that in Table 1. $P_{rsvp\_RX}$ is indicated by a resource reservation field in an SCI format 1, and is defined in Table 2. A specific value X is the reservation period of the PSSCH divided by 100. When $P_{rsvp\_RX}$<1 and n'-m≤$P_{step}\times P_{rsvp\_RX}$, Q=1/$P_{rsvp\_RX}$; otherwise, Q=1. OF $t_n^{SL}$ belongs to the time unit set ($t_0^{SL}$, $t_1^{SL}$, . . . , $t_{max}^{SL}$), $t_{n'}^{SL}$ is $t_n^{SL}$; otherwise, $t_{n'}^{SL}$ is the $1^{st}$ time unit that belongs to the time unit set ($t_0^{SL}$, $t_1^{SL}$, . . . , $t_{max}^{SL}$) and that is after the time unit $t_n^{SL}$.

TABLE 2

| Resource reservation field | X |
|---|---|
| '0001', '0010', . . . , '1010' | 1, 2, . . . , 10 |
| '1011' | 0.5 |
| '1100' | 0.2 |
| '0000' | 0 |
| '1101', '1110', '1111' | Reserved |

4. 5G NR Fame Sructure

It can be learnt from definitions in an existing protocol that, an NR frame structure is more flexible and variable than an LTE frame structure. Duration of each system frame is the same as that in LTE, and is still 10 ms. A range of system frame numbers (SFN) is 0-1023, duration of each subframe is still 1 ms, and subframe numbers in a system frame are 0-9. A relationship between a slot in each subframe and a subcarrier spacing in 5G NR is listed in the following Table 3:

TABLE 3

Relationship between a slot and a subcarrier spacing

| | Slot configuration (common cyclic prefix) | | |
|---|---|---|---|
| Subcarrier spacing (kHz) | Quantity of symbols per slot | Quantity of slots per subframe | Quantity of slots per frame |
| 15 | 14 | 1 | 10 |
| 30 | 14 | 2 | 20 |
| 60 | 14 | 4 | 40 |
| 120 | 14 | 8 | 80 |
| 240 | 14 | 16 | 160 |
| 480 | 14 | 32 | 320 |
| | Slot configuration (extended cyclic prefix) | | |
| 60 | 12 | 4 | 40 |

Figure 6:
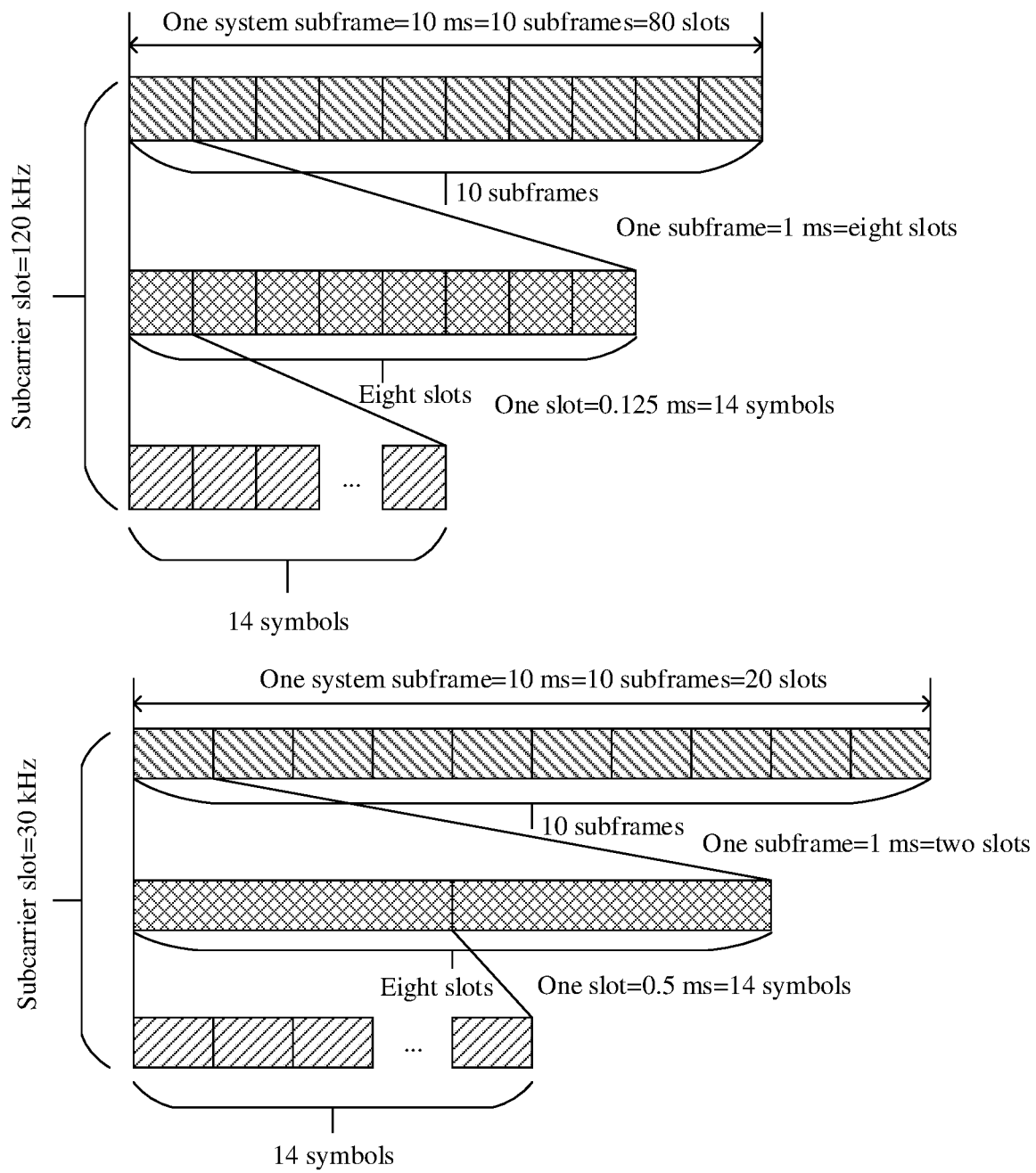
FIG. 6 is a schematic diagram of frame structures according to an embodiment of this application.

NR frame structures in which SCSs are, for example, 30 kHz and 120 kHz are shown in FIG. 6. FIG. 6 is a schematic diagram of frame structures according to an embodiment of this application.

Figure 7:
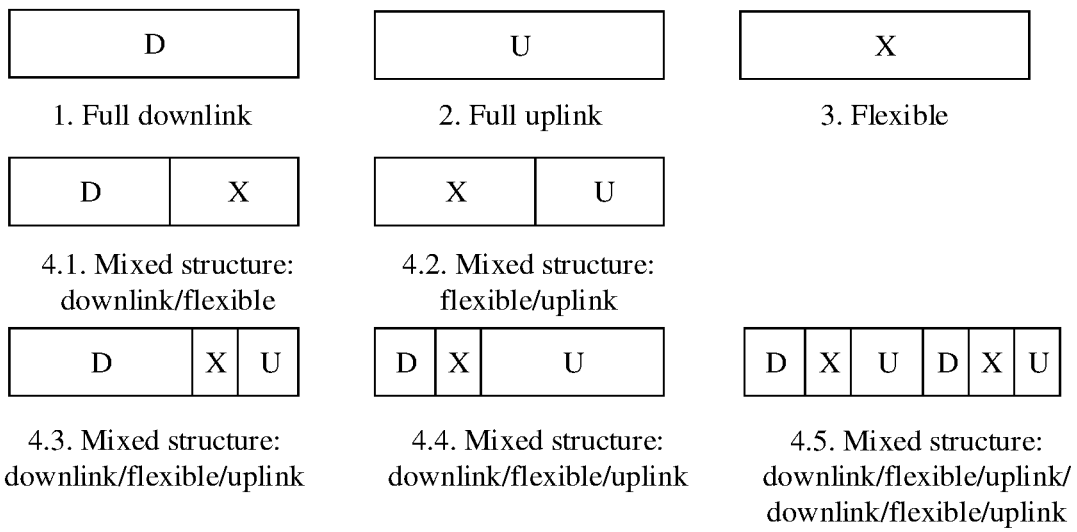
FIG. 7 is a schematic diagram of slot types according to an embodiment of this application.

Compared with a subframe-level frame structure configuration in LTE, the NR frame structure is more flexible. DL and UL configurations in NR may be at symbol levels, and are respectively a downlink symbol D, an uplink symbol U, and a flexible symbol X (which may be used for downlink transmission and uplink transmission, and used as a gap (GAP) or a reserved resource). In addition, slot types in NR include four structures shown in FIG. 7. FIG. 7 is a schematic diagram of slot types according to an embodiment of this application. The slot types are as follows: a full downlink slot, which is used for downlink transmission, as shown in (1) in FIG. 7; a full uplink slot, which is used for uplink transmission, as shown in (2) in FIG. 7; a full flexible slot, as shown in (3) in FIG. 7; and a mixed slot, which includes at least one downlink symbol and/or uplink symbol, as shown in (4.1) to (4.5) in FIG. 7.

It should be understood that FIG. 7 is merely an example used to describe different slot types in NR, and does not constitute any limitation on this application.

A specific slot configuration solution for 5G NR may be divided into four layers:

A first layer is a cell-based radio resource control (RRC) signaling semi-persistent configuration that is carried in UL-DL-configuration-common information and UL-DL-configuration-common-Set2 information that are in a system information block 1 (SIB1), and a frame structure period is {0.5, 0.625, 1, 1.25, 2, 2.5, 5, 10} ms and is independent of a subcarrier spacing.

A second layer is a UE-based RRC signaling semi-persistent configuration that is carried in higher layer signaling UL-DL-configuration-dedicated, and a frame structure period is {0.5, 0.625, 1, 1.25, 2, 2.5, 5, 10} ms and is independent of a subcarrier spacing.

A third layer is a user equipment group slot format information (UE-group SFI) indicator signaling dynamic configuration that is carried in a downlink control information format 2_0 (DCI format 2_0), and a frame structure period is {1, 2, 4, 5, 8, 10, 20} slots and is independent of a subcarrier spacing.

A fourth layer is a user equipment specific downlink control information (UE-specific DCI) indicator signaling dynamic configuration that is carried in DCI formats 0 and 1.

Specifically, a transmission status of each symbol included in a slot is any one of the following three states: an uplink (UL) transmission state, a downlink (DL) transmission state, and an unknown state, which may be denoted as UL/DL/X (or briefly denoted as U/D/X), where X is referred to as an unknown state or a flexible state, a terminal device neither receives nor transmits information on a symbol corresponding to the X state, and X may also be referred to as F or U.

For example, a slot format_0 indicates that transmission states of 14 symbols included in one slot are all downlink transmission states. A slot format-1 indicates that transmission states of 14 symbols included in one slot are all uplink transmission states. A slot format_2 indicates that transmission states of 14 symbols included in one slot are all in a non-uplink transmission state and a non-downlink transmission state. A maximum of 256 slot formats may exist in 5G NR, and are not enumerated herein. Further, different slot formats include different quantities of uplink transmission symbols, downlink transmission symbols, or flexible symbols. It should be understood that, this embodiment of this application does not relate to a manner of configuring a slot format, but only relates to different frame structures corresponding to different subcarrier spacings. Quantities of slots/symbols in different frame structure periods are different, and therefore details about the slot formats in NR are not described herein.

The foregoing briefly describes the resource configuration modes in the LTE mode 3 and the LTE mode 4 with reference to FIG. 3 to FIG. 5. Values of $P_{SPS}=P_{step} \times P_{SPS}/100$ and $P_{rsvp\_TX}=P_{step} \times P_{rsvp\_TX}/100$ in a resource configuration process are strongly related to an LTE frame structure, and the LTE frame structure is in a fixed mode, as listed in Table 1. In other words, the resource configuration modes can be used only in LTE V2X.

Based on the V2X communications technology, vehicle user equipment (V-UE) can send, to surrounding V-UEs, some information about the vehicle user equipment, for example, information triggered by periodic events such as a location, a speed, and an intention (turning, changing a lane, or backing a car) and some aperiodic events, and the V-UE receives, in real time, information sent by the surrounding V-UEs. LTE V2X communication satisfies some basic requirements in a V2X scenario. However, LTE V2X communication currently cannot effectively support future application scenarios such as full intelligent driving and autonomous driving. With development of the 5th generation new radio (5G NR) communications technology in the 3GPP specifications organization, V2X in a 5G NR system will be further developed. For example, V2X can support a lower transmission latency, more reliable communication transmission, a higher throughput, and better user experience, satisfying requirements for a wider range of application scenarios.

To smoothly develop 5G NR V2X, the embodiments of this application propose two resource configuration modes: a 5G NR mode 1 and a 5G NR mode 2, which are corresponding to the LTE mode 3 and the LTE mode 4, respectively.

Figure 8:
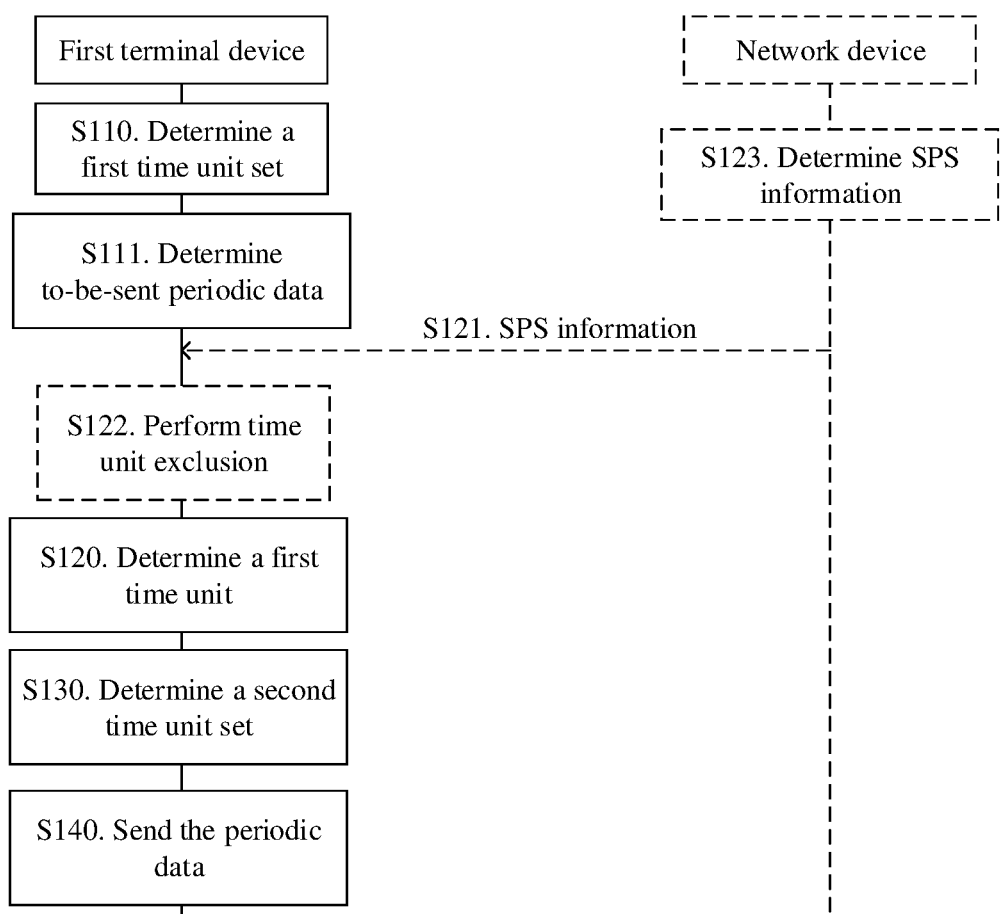
FIG. 8 is a schematic flowchart of a communication method according to an embodiment of this application.
Figure 9:
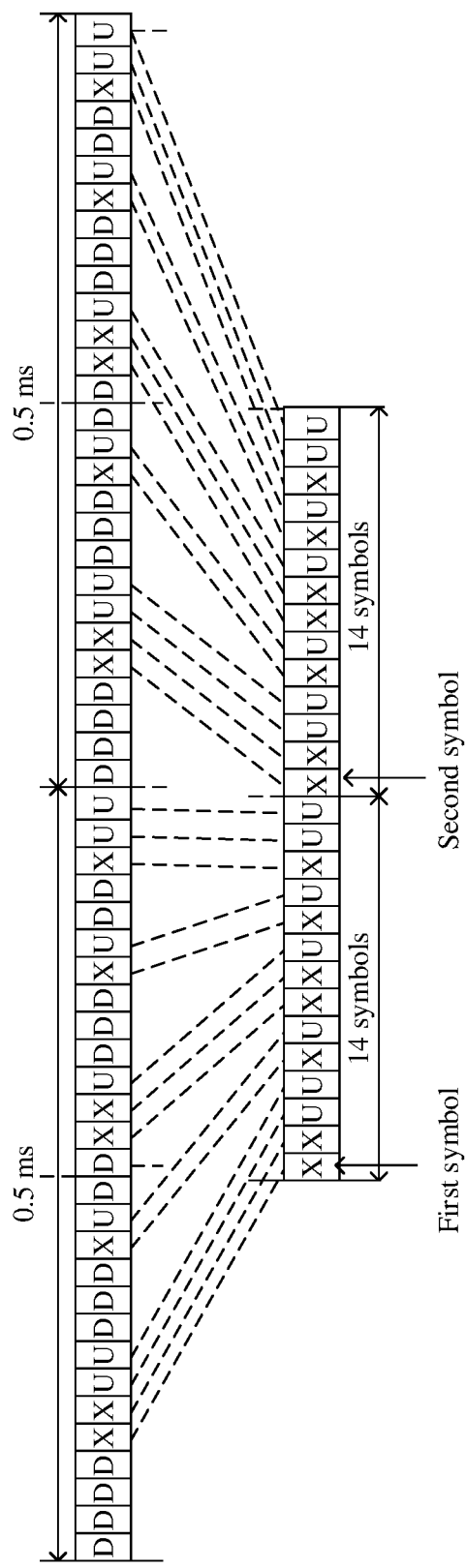
FIG. 9 is a schematic diagram of a frame structure according to an embodiment of this application.
Figure 10:
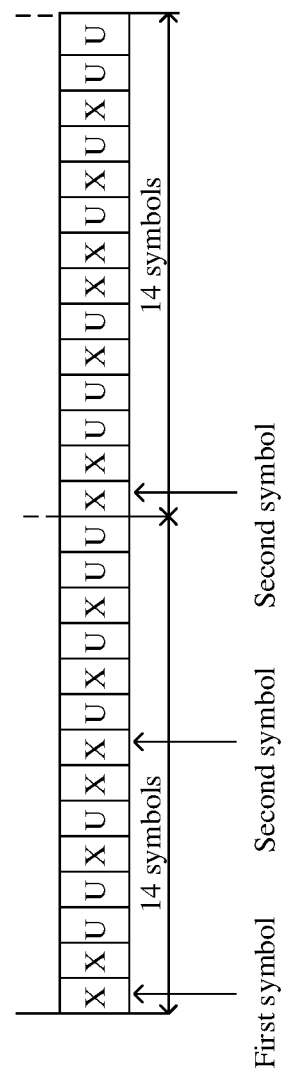
FIG. 10 is a schematic diagram of a time unit set according to an embodiment of this application.

With reference to FIG. 8 to FIG. 10, the following details a communication method provided in the embodiments of this application.

FIG. 8 is a schematic flowchart of a communication method according to an embodiment of this application. From an interaction perspective, a possible procedure for the communication method provided in this embodiment of this application is described, including: a first terminal device, a network device, and steps S110 to S140.

Specifically, the first terminal device needs to periodically send periodic data. In other words, the method procedure shown in FIG. 8 includes S111: The first terminal device determines to-be-sent periodic data. That the first terminal device determines to-be-sent periodic data can be understood as: The to-be-sent periodic data arrives at a physical layer or another transport layer of the first terminal device.

It should be understood that, the periodic data in this application means that data of some services periodically arrives at the terminal device, that is, the terminal device may determine, based on a periodic characteristic of the data, a time unit that needs to be used to transmit the periodic data in future time. It should be noted that the periodic data in this embodiment of this application is focused on a transmission characteristic, that is, periodic transmission, of the data, and whether the data changes is not limited. For example, content of the data transmitted in a first period may be different from content of the data transmitted in a second period.

To determine a time-frequency resource used to transmit the periodic data, the following steps are performed. It should be understood that determining of the time-frequency resource used to transmit the periodic data in this application mainly involves determining of a time domain location of the time-frequency resource, but does not involve a change in determining of a frequency domain location of the time-frequency resource. However, in a 5G NR scenario, a time domain location is usually determined based on a time unit, and a time unit in this application may be a symbol or a slot in 5G NR (as listed in the foregoing Table 3, different subcarrier spacings are corresponding to different symbols or slots). In other words, when a time unit used to send periodic data is determined in the following, it should be understood that a time-frequency resource whose time domain location is the time unit is used to transmit the periodic data.

S110. The first terminal device determines a first time unit set.

Specifically, the first time unit set includes a time unit that is specified in a protocol and that can be used by the first terminal device to transmit the periodic data in a system frame.

It should be understood that the periodic data in this embodiment of this application includes at least one of sidelink service data, sidelink control information, and sidelink feedback information. The sidelink service data may also be referred to as a physical sidelink data channel PSSCH, the sidelink control information may also be referred to as a physical sidelink control channel (PSCCH), and the sidelink feedback information may also be referred to as a physical sidelink feedback channel (PSFCH). For ease of description, periodic data in the following is replaced with a PSSCH.

It should also be understood that transmission of the PSSCH by the first terminal device can be understood as sending of the PSSCH by the first terminal device, and may be described in a plurality of ways. This is not limited in this application. The following mainly describes transmission of the PSSCH by the first terminal device.

The first time unit set may be $(t_0^{SL}, t_1^{SL}, \ldots, t_{max}^{SL})$, where $t_i^{SL}$ represents a time unit that can be used to transmit the PSSCH, where i=0, 1, ..., and max.

Specifically, when a time unit in the first time unit set is a symbol, $0 \leq t_i^{SL} \leq 10240 \times N_{slot} \times 14$; or when a time unit in the first time unit set is a slot, $0 \leq t_i^{SL} \leq 10240 \times N_{slot}$, where 10240 represents a total quantity of subframes in a system frame, and $N_{slot}$ represents a quantity of slots in each subframe corresponding to different subcarrier spacings. In addition, the following time units need to be excluded from the first time unit set that can be used for PSSCH transmission: (1)

a time unit used for sidelink synchronization signal (SLSS) transmission; (2) a downlink time unit and a special time unit in a TDD mode in which the first terminal device operates; and (3) a reserved time unit.

In this case, the first time unit set in this application may be any one of the following time unit sets: (1) a time unit that is left among all time units in a system frame corresponding to a preset subcarrier spacing after a time unit that is configured for sending a sidelink synchronization signal (SLSS) is excluded from the system frame, where if a frame structure type is a TDD carrier, the downlink time unit and the special time unit in the TTD mode are further excluded; (2) a time unit that is left among all time units in a system frame corresponding to a preset subcarrier spacing after time units that are configured for sending an SLSS and configured for sending a cell-specific SRS are excluded from the system frame, where if a frame structure type is a TDD carrier, the downlink time unit and the special time unit in the TTD mode are further excluded; (3) a time unit that is left among all time units in a system frame corresponding to a preset subcarrier spacing after time units that are configured for sending an SLSS, configured for sending a cell-specific SRS, and configured for sending a PRACH are excluded from the system frame, where if a frame structure type is a TDD carrier, the downlink time unit and the special time unit in the TTD mode are further excluded; (4) a time unit that is left among all time units in a system frame corresponding to a preset subcarrier spacing after time units that are configured for sending an SLSS, configured for sending a cell-specific SRS, and reserved for a PUSCH are excluded from the system frame, where if a frame structure type is a TDD carrier, the downlink time unit and the special time unit in the TTD mode are further excluded; or (5) a time unit that is left among all time units in a system frame corresponding to a preset subcarrier spacing after time units that are configured for sending an SLSS, configured for sending a cell-specific SRS, configured for sending a PRACH, and reserved for a PUSCH are excluded from the system frame, where if a frame structure type is a TDD carrier, the downlink time unit and the special time unit in the TTD mode are further excluded.

It should be understood that the foregoing (1) to (5) merely provide several possible forms of the first time unit set, and do not constitute any limitation on the protection scope of this application. The first time unit set in this application may be a time unit set that is defined in an existing protocol and that can be used to transmit the PSSCH, or may be a time unit set that is defined in a future protocol in a communications technology development process and that can be used to transmit the PSSCH. This is not strictly limited in this application. Details about the first time unit set are not described herein.

Specifically, the first time unit set includes a plurality of time units, and the plurality of time units are consecutively numbered in a time sequence. In other words, each of the plurality of time units has a corresponding number. The number of each time unit can be understood as a sequence of the time unit in the first time unit set.

For example, the plurality of time units in the first time unit set are consecutively numbered starting from a number 0 in a time sequence, and then an ascending order of the time units is $(t_0^{SL}, t_1^{SL}, \ldots, t_{max}^{SL})$. In this case, the plurality of time units in the first time unit set may be referred to as the $0^{th}$ time unit, the $1^{st}$ time unit, ..., and the $max^{th}$ time unit, where a value of max is a value obtained by subtracting 1 from a total quantity of time units in the first time unit set.

Alternatively, the plurality of time units in the first time unit set are consecutively numbered in a time sequence starting from a number 1, and then an ascending order of the time units is $(t_1^{SL}, t_2^{SL}, \ldots, t_{max+1}^{SL})$. In this case, the plurality of time units in the first time unit set may be referred to as the $1^{st}$ time unit, the $2^{nd}$ time unit, ..., and the $(max+1)^{th}$ time unit.

Alternatively, the plurality of time units in the first time unit set are consecutively numbered in a time sequence starting from a number X, and then an ascending order of the time units is $(t_X^{SL}, t_{X+1}^{SL}, \ldots, t_{max+X}^{SL})$. In this case, the plurality of time units in the first time unit set may be referred to as the $X^{th}$ unit, the $(X+1)^{th}$ unit, ..., and the $(max+X)^{th}$ time unit, where X is a positive integer.

It should be understood that in this embodiment of this application, the plurality of time units in the first time unit set are consecutively numbered in a time sequence starting from a specific numeral, and the specific numeral is not limited, provided that the plurality of time units in the first time unit set are sorted in ascending order of numbers. For ease of understanding, the following uses a specific example to describe how to sort the time units based on a number sequence.

For example, the first time unit set includes 10 time units (SL#1 to SL#10), and the 10 time units are sorted starting from a number 0, and are consecutively numbered by using a tolerance of an arithmetic progression being 1. Then, the 10 time units are consecutively numbered 0, 1, 2, 3, 4, 5, 6, 7, 8, and 9. Finally, after the 10 time units are sorted based on a number sequence, the time units are sequentially SL#1, SL#2, SL#3, SL#4, SL#5, SL#6, SL#7, SL#8, SL#9, and SL#10.

The foregoing briefly describes, by using the example, a manner of sorting the time units in the first time unit set based on the number sequence in this application. It should be understood that the foregoing descriptions are merely an example, and cannot be used to limit the protection scope of this application. Specific sorting manners cannot be enumerated. Therefore, details are not described herein.

S120. The first terminal device determines a first time unit.

The first terminal device determines the first time unit from the first time unit set determined in S110, where the first time unit is used to send the PSSCH.

For example, at a start moment of the first time unit or before the start moment of the first time unit, the first terminal device determines to transmit the PSSCH by using a first time-frequency resource whose time domain location is the first time unit. For example, this application provides two solutions for determining the first time unit by the first terminal device.

Solution 1

Before determining the first time unit from the first time unit set, the first terminal device receives semi-persistent scheduling (SPS) information from the network device, where the SPS information indicates that the first time unit in the first time unit set is used to send the PSSCH.

For example, the first terminal device receives the SPS information from the network device at the start moment of the first time unit or before the start moment of the first time unit, where the SPS information indicates that the first time-frequency resource whose time domain location is the first time unit is to be allocated to the first terminal device, so that the first terminal device transmits the PSSCH by using the first time-frequency resource.

In the case shown in the solution 1, the method shown in FIG. 8 further includes S121, that is, the network device sends the SPS information to the first terminal device; and S123, that is, the network device determines the SPS information. Specifically, in this application, the following manner is not limited: The network device performs resource coordination to determine allocation of the first time-frequency resource to the first terminal device, so that the first terminal device transmits the PSSCH by using the first time-frequency resource. Any prior-art resource coordination solution may be used.

For ease of understanding, a specific example is used to briefly describe how the first terminal device learns, in the solution 1, that the PSSCH is to be transmitted by using the first time-frequency resource.

For example, the network device determines, based on a load status, that the first time-frequency resource may be allocated to the first terminal device, where the time domain location of the first time-frequency resource is corresponding to the first time unit. The first terminal device may transmit the PSSCH by using the first time-frequency resource. At the start moment of the first time unit or before the start moment of the first time unit, the network device sends the SPS information to the first terminal device. The SPS information indicates that the first terminal device is to send the PSSCH by using the first time-frequency resource whose time domain location is the first time unit in the first time unit set.

Solution 2

In the case shown in the solution 2, the method shown in FIG. 8 further includes S122: The first terminal device performs time unit exclusion.

Specifically, the first terminal device first determines a time unit reserved for historical periodic data that is sent in a third time unit set. The historical periodic data is data received by the terminal device before the PSSCH arrives, and the data is also periodic. For the time unit reserved for the historical periodic data, after the first terminal device receives the historical periodic data in a time unit in the third time unit set, because the historical periodic data is periodic data, the first terminal device needs to determine a specific time unit in which the historical periodic data may be sent, where the specific time unit is the time unit reserved for the historical periodic data.

Then, the first terminal device determines at least one time unit that is in a fourth time unit set and that is reserved for the historical periodic data. Specifically, when at least one time unit in the time unit reserved for the historical periodic data is located in the fourth time unit set, the first terminal device needs to determine the at least one time unit from the fourth time unit set. The at least one time unit is referred to as the at least one time unit reserved for the historical periodic data. Finally, the first terminal device excludes a time unit that is in the fourth time unit set and that satisfies a preset time relationship with the at least one time unit reserved for the historical periodic data, and determines the first time unit from one or more remaining time units in the fourth time unit set.

The PSSCH arrives in a third time unit, the third time unit set includes P time units before the third time unit, P is a positive integer, the third time unit set is a subset of the first time unit set, the fourth time unit set is a subset of the first time unit set, a start time unit in the fourth time unit set is later than the third time unit, and the P time units are consecutively numbered from n'P to n'-1. n' includes the following: When the third time unit is a time unit in the first time unit set, n' is a number of the third time unit in the first time unit set; or when the third time unit is not a time unit in the first time unit set, n' is a number of the $1^{st}$ time unit that belongs to the first time unit set and that is after the third time unit.

In a possible implementation, for the P time units, $P=P_N \times S_{symbol}$, where $P_N$ is a positive integer, $S_{symbol}$ represents a quantity of time units available for sidelink communication transmission in one frame structure period, and the $P_N \times S_{symbol}$ time units are consecutively numbered from $n'-P_N \times S_{symbol}$ to $n'-1$. A specific value of $P_N$ may be configured by the network device for the first terminal device by using higher layer signaling, or may be predefined in a protocol. This is not limited in this application. For example, if the higher layer signaling indicates that $P_N$ is 100, the third time unit set includes $100 \times S_{symbol}$ time units before the third time unit, where the $00 \times S_{symbol}$ time units are sequentially numbered from $n'-100 \times S_{symbol}$ to $n'-1$.

In another possible implementation, P is configured by using higher layer signaling or is preconfigured. For example, a protocol specifies that P=200.

For example, the third time unit is a time unit in an entire time unit set in a system frame, time units in the entire time unit set in the system frame are numbered in chronological order, and a number of the third time unit is n. For example, when a time unit in this application is a symbol, a total quantity of time units in an entire time unit set in a system frame is 10240*14*W, where W is a quantity of slots in each subframe corresponding to a preset subcarrier spacing. When a time unit in this application is a slot, a total quantity of time units in an entire time unit set in a system frame is 10240*W, where W is a quantity of slots in each subframe corresponding to a preset subcarrier spacing. The 10240*14*W or 10240*W time units are numbered in chronological order. It is assumed that the third time unit is a time unit numbered 10 in an entire time unit set in a system frame. Specifically, the first time unit set is a time unit set obtained by numbering, in chronological order, remaining time units that are left after some time units are excluded from an entire time unit set in a system frame. It is assumed that, when some time units in an entire time unit set in a system frame are excluded to obtain the first time unit set, time units numbered 0 to 5 are excluded from time units numbered 0 to 10 in the entire time unit set in the system frame. In this case, when the third time unit is a time unit in the first time unit set, the number of the third time unit in the first time unit set is 4.

For example, the fourth time unit set may be similar to the subframe selection time window shown in FIG. 5. For example, the fourth time unit set may be a time unit set including time units that belong to the first time unit set and that are in a window $[n+T_1, n+T_2]$ in a system frame, where $T_1 \leq 4$, $20 \leq T_2 \leq 100$, and n is the number n of the third time unit. It should be understood that value ranges and specific values of $T_1$ and $T_2$ are preconfigured, or value ranges and specific values of $T_1$ and $T_2$ are configured by using higher layer signaling. This is not limited in this application.

Further, the selecting the first time unit from the one or more remaining time units in the fourth time unit set may be: selecting, from the one or more remaining time units, any available time unit as the first time unit; or calculating an average energy value for a time-frequency resource whose time domain location is each of the one or more remaining time units, and selecting a time unit corresponding to a time-frequency resource with relatively low average energy as the first time unit.

For example, the excluding, by the first terminal device, a time unit that is in the fourth time unit set and that cannot be used to send the PSSCH includes: determining, by the first terminal device, first historical periodic data is sent by the first terminal device in a fourth time unit in the third time unit set; and determining, by the first terminal device, at least one time unit that is in the fourth time unit set and that is reserved for the first historical periodic data.

It can be understood that the first terminal device detects whether the time units that are in the third time unit set and that are present before the PSSCH arrives include a time unit used by the first terminal device to send the first historical periodic data (not the periodic PSSCH). Then, whether the at least one time unit in the time unit reserved for the historical periodic data is included in the fourth time unit set may be determined. If the at least one time unit is included in the fourth time unit set, a time unit that is in the fourth time unit set and that satisfies a first preset time relationship with the at least one time unit needs to be excluded.

Specifically, the first preset time relationship is that there is a natural number j that makes the following equation hold true:

$$y+j\times[S_{symbol}\times P_{rsvp\_TX}/N_{symbol}]=z+q\times[S_{symbol}], \text{ where}$$

$z+q\times[S_{symbol}\times P''_{rsvp\_TX}/N_{symbol}]$ represents a location, in the fourth time unit set, of the at least one time unit reserved for the first historical periodic data, z is a number of the fourth time unit, q is a positive integer less than or equal to $Q_1$, y is a number of the time unit that satisfies the first preset time relationship with the at least one time unit reserved for the first historical periodic data, j is a natural number less than or equal to $C_{resel}-1$, $C_{resel}$ is the reservation quantity of PSSCHs, $N_{symbol}$ represents a total quantity of time units in one frame structure period, $S_{symbol}$ represents the quantity of time units available for sidelink communication transmission in one frame structure period, $P_{rsvp\_TX}$ represents a reservation period of the periodic data, the reservation period of the periodic data is measured in time units, $P''_{rsvp\_TX}$ represents a reservation period of the first historical periodic data, and the reservation period of the first historical periodic data is measured in time units. When $P''_{rsvp\_TX}/(K*N_{symbol})<1$ and $n'-z\leq[S_{symbol}\times P''_{rsvp\_TX}/N_{symbol}]$, $Q_1=K/(P''_{rsvp\_TX}/N_{symbol})$; otherwise, $Q_1=1$. K is a preconfigured positive integer, K is a positive integer indicated by higher layer signaling, or K is a positive integer indicated dynamically. [ ] represents a rounding up or rounding down operation.

A time unit numbered y is the time unit that is in the fourth time unit set and that cannot be used to send the PSSCH. It is understood that a time-frequency resource $R_{x,y}$ corresponding to the time unit numbered y cannot be used to transmit the PSSCH, where y in $R_{x,y}$ represents a number of the time unit. Specifically, $R_{x,y}$ is a time-frequency resource block. In time domain, the time-frequency resource is the time unit numbered y. In frequency domain, the time-frequency resource is a set of continuous time-frequency resources that start from x and each of which has a length L. Specifically, values of x and L are known to the first terminal device. For example, the first terminal device knows that the available time-frequency resources have a total of 20 subchannels, where the 20 subchannels are consecutively numbered from 0 to 19, and the first terminal device knows that L is 2. In this case, the 20 subchannels may be divided into 19 time-frequency resource blocks, and each time-frequency resource block includes two subchannels. The subchannel can be understood as a unit used to indicate the time-frequency resource.

For ease of understanding, the following uses a specific example to describe a case in which the time unit that is numbered y and that is indicated by the formula is excluded.

It is assumed that the third time unit in which the PSSCH arrives is located in the first time unit set, the number of the third time unit in the first time unit set is 100, and P=100. In this case, the time units in the third time unit set are continuously numbered from 0 to 99. If $T_1=1$ and $T_2=20$, time units in the fourth time unit set are consecutively numbered from 101 to 120. It is assumed that the first historical periodic data is sent in a time unit numbered 95 in the third time unit set, the reservation period of the first historical periodic data is $P''_{rsvp\_TX}=30$ (time units), the quantity of time units available for sidelink communication transmission in one frame structure period is $S_{symbol}=5$, the total quantity of time units in one frame structure period is $N_{symbol}=10$, and K=10. $P''_{rsvp\_TX}/(K*N_{symbol})=1$; therefore, $Q_1=1$, and q=1. In this case, a right-side value of the formula is 110.

When the time unit that satisfies the first preset time relationship with the at least one time unit reserved for the first historical periodic data is excluded from the fourth time unit set, whether each time unit in the fourth time unit set makes the formula hold true is separately determined. It is assumed that the reservation quantity of PSSCHs is $C_{resel}=10$, and the reservation period of the PSSCH is $P_{rsvp\_TX}=10$ (time units), In this case, a left side of the equation is simplified to be y+5j, where j=0, 1, 2, 3, . . . , and 9.

In other words, the equation is simplified to be y+5j=110. Whether the $1^{st}$ time unit in the fourth time unit set makes the equation hold true is determined. Because y corresponding to the $1^{st}$ time unit is 101, and there is no j that makes y=101 satisfy the equation, the $1^{st}$ time unit in the fourth time unit set cannot be excluded. Likewise, the $2^{nd}$ time unit in the fourth time unit set cannot be excluded. Because y corresponding to the $5^{th}$ time unit is 105, and j=1 makes y=105 satisfy the equation, the $5^{th}$ time unit in the fourth time unit set needs to be excluded. Because y corresponding to the $10^{th}$ time unit is 110, and j=0 makes y=110 satisfy the equation, the $10^{th}$ time unit in the fourth time unit set needs to be excluded. The rest can be deduced by analogy.

It should be understood that the foregoing descriptions merely use an example to describe a process of excluding the time unit that satisfies the first preset time relationship with the at least one time unit reserved for the first historical periodic data, and does not constitute any limitation on this application. In an actual exclusion process, a right-side value of the equation may be different from the foregoing value, and a left-side value of the equation may also be different from the foregoing value. No more examples are provided for description herein.

The excluding, by the first terminal device, a time unit that is in the fourth time unit set and that cannot be used to send the PSSCH further includes: obtaining, by the first terminal device through monitoring, sidelink control information (SCI) from a second terminal device, where the SCI is used to indicate second historical periodic data of the second terminal device. The second terminal device does not particularly mean one terminal device, and may be one or more terminal devices other than the first terminal device. It can be understood that the first terminal device may determine, through monitoring, whether the at least one other terminal device has sent second historical periodic data in the third time unit set, and whether a time unit reserved for the second historical periodic data is included in the fourth time unit set; decoding, by the first terminal device, the SCI to obtain a reservation period $P_{rsvp\_RX}$ and a priority $prio_{Rx}$ that are of the second historical periodic PSSCH, where $P_{rsvp\_RX}$ and $prio_{RX}$ are used to determine a threshold $Th_{prioTX,prioRX}$, and the second terminal device is a terminal device other than the first terminal device; and determining, by the terminal device, that a measurement result of reference signal received power (RSRP) of the second historical periodic data in a fifth time unit in the third time unit set is greater than $Th_{prioTX,prioRX}$, and determining, by the first terminal device, at least one time unit that is in the fourth time unit set and that is reserved for the second historical periodic data sent by the second terminal device. It is understood that a time-frequency resource $R_{x,y}$ corresponding to a time unit numbered y' cannot be used to transmit the PSSCH, where x is used to indicate a frequency domain location of $R_{x,y}$.

It can be understood that the first terminal device detects whether the time units in the third time unit set before the periodic PSSCH arrives include a time unit used by the another terminal device to send the second historical periodic data. Then, it may be determined whether the at least one time unit in the time unit reserved for the second historical periodic data sent by the another terminal device is included in the fourth time unit set. If the at least one time unit is included in the fourth time unit set, a time unit that is in the fourth time unit set and that satisfies a second preset time relationship with the at least one time unit needs to be excluded.

Specifically, the second preset time relationship is that there is a natural number j that makes the following equation hold true:

$$y'+j\times[S_{symbol}\times P_{rsvp\_TX}/N_{symbol}]=z'+q\times[S_{symbol}\times P_{rsvp\_RX}/N_{symbol}], \text{ where}$$

$z'+q\times[S_{symbol}\times P_{rsvp\_RX}/N_{symbol}]$ represents a number of the at least one time unit reserved for the second historical periodic data, z' is a number of the fifth time unit, q is a positive integer less than or equal to $Q_2$, y' is a number of the time unit that satisfies the second preset time relationship with the at least one time unit reserved for the second historical periodic data, j is a natural number less than or equal to $C_{resel}-1$, $C_{resel}$ is the reservation quantity of PSSCHs, $S_{symbol}$ represents the quantity of time units available for sidelink communication transmission in one frame structure period, $N_{symbol}$ represents the total quantity of time units in one frame structure period, $P_{rsvp\_TX}$ represents the reservation period of the periodic data, the reservation period of the periodic data is measured in time units, $P_{rsvp\_RX}$ represents the reservation period of the second historical periodic data, the reservation period of the second historical periodic data is measured in time units, and [ ] represents a rounding up or rounding down operation. When $P_{rsvp\_RX}/(K*N_{symbol})<1$ and $n'-z'\leq N_{symbol}\times P_{rsvp\_RX}$, $Q_2=K/(P_{rsvp\_RX}/N_{symbol})$; otherwise, $Q_2=1$. K is a preconfigured positive integer, K is a positive integer indicated by higher layer signaling, or K is a positive integer indicated dynamically.

If there is j that makes the equation hold true, the time-frequency resource $R_{x,y}$ corresponding to the time unit numbered y' cannot be used to send the PSSCH, where y' in $R_{x,y}$ indicates a number of the time unit. Specifically, $R_{x,y}$ is a time-frequency resource block. In time domain, the time-frequency resource is the time unit numbered y'. In frequency domain, the time-frequency resource is a set of continuous time-frequency resources that start from x and each of which has a length L.

In an actual application process of the technical solutions of this application, when a proportion of the one or more remaining time units in the fourth time unit set to a total quantity of time units in the fourth time unit set is less than 20%, a value of the threshold $Th_{prioTX,prioRX}$ needs to be adjusted, until the proportion of the one or more remaining time units in the fourth time unit set to the total quantity of time units in the fourth time unit set is greater than or equal to 20%.

For ease of understanding, a specific example is used to briefly describe how the first terminal device learns, in the solution 2, that the PSSCH is to be transmitted by using the first time unit.

For example, at a start moment of a time unit $t_n^{SL}$, the first terminal device continuously monitors a time unit that is in the third time unit set $(t_{n'-P_N\times S_{symbol}}, t_{n'-P_N\times S_{symbol}+1}, \ldots,$ and $t_{n'-1}^{SL})$ other than a time unit in which the first terminal device has sent data, determines a reservation status of the time unit, and performs time unit exclusion based on the reservation status.

Specific time unit exclusion principles are as follows:

(1) It is assumed that the first terminal device has sent data is in a fourth time unit $t_z^{SL}$ in the third time unit set. If there is an integer j that makes $y+j\times[S_{symbol}\times P_{rsvp\_TX}/N_{symbol}]=z+q\times[S_{symbol}\times P''_{rsvp\_TX}/N_{symbol}]$ hold true, that the time unit numbered y is excluded is understood as: The resource $R_{x,y}$ corresponding to the time unit numbered y cannot be used to transmit the PSSCH. Herein, $P_{rsvp\_TX}$ represents the reservation period of the PSSCH sent by the first terminal device, and is measured in time units. $N_{symbol}$ represents a total quantity of time units in a single frame structure period in a frame structure configuration, and $S_{symbol}$ represents a quantity of time units available for sidelink transmission in the single frame structure period in the frame structure configuration. j is a natural number less than or equal to $C_{resel}-1$, and $C_{resel}$ represents the preset reservation quantity of PSSCHs and is a constant. $P_{rsvp\_TX}$ represents the reservation period of the periodic data, the reservation period of the periodic data is measured in time units, $P''_{rsvp\_TX}$ represents a reservation period of the data sent in the time unit $t_z^{SL}$ and is measured in time units, [ ] represents a rounding up or rounding down operation, and $q=1, 2, 3, \ldots,$ and $Q_1$. When $P''_{rsvp\_TX}/(K*N_{symbol})<1$ and $n'-z\leq[S_{symbol}\times P''_{rsvp\_TX}/N_{symbol}]$, $Q_1=K/(P''_{rsvp\_TX}/N_{symbol})$; otherwise, $Q_1=1$. If a time unit in which the first terminal device receives the periodic PSSCH belongs to a time unit set $(t_0^{SL}, t_1^{SL}, \ldots, t_{max}^{SL})$, $t_n^{SL}$ is the time unit in which the periodic PSSCH is received; otherwise, $t_n^{SL}$ is the $1^{st}$ time unit that belongs to the time unit set $(t_0^{SL}, t_1^{SL}, \ldots, t_{max}^{SL})$ and that is after the time unit n.

(2) It is assumed that the first terminal device obtains SCI of another terminal device, decodes the SCI to determine $P_{rsvp\_RX}$ of a PSSCH transmitted by the another terminal device and $prio_{RX}$, and calculates a threshold $Th_{prioTX,prioRX}$ based on $P_{rsvp\_RX}$ and $prio_{Rx}$. If a measurement result of RSRP of the PSSCH transmitted by the another terminal device is greater than the threshold $Th_{prioTX,prioRX}$, and there is an integer j that makes $y'+j\times[S_{symbol}\times P_{rsvp\_TX}/N_{symbol}]=z+q\times[S_{symbol}\times P_{rsvp\_RX}/N_{symbol}]$ hold true, that the time unit numbered y' is excluded is understood as: The resource $R_{x,y}$ corresponding to the time unit numbered y' cannot be used to transmit the PSSCH, where z' is a number of a time unit in which the another terminal device sends the data. Herein, $P_{rsvp\_TX}$ represents the reservation period of the PSSCH, and is measured in time units. $N_{symbol}$ represents a total quantity of time units in a single frame structure period in a frame structure configuration, and $S_{symbol}$ represents a quantity of time units available for sidelink transmission in the single frame structure period in the frame structure configuration.

j is a natural number less than or equal to $C_{resel}-1$, and $C_{resel}$ represents the reservation quantity of PSSCHs and is a constant. q=1, 2, 3, . . . , and $Q_2$. When $P_{rsvp\_RX}/(k*N_{symbol})$ <1 and $n'-z' \leq N_{symbol} \times P_{rsvp\_RX}$, $Q_2=K/(P_{rsvp\_RX}/N_{symbol})$; otherwise, $Q_2=1$. If a time unit in which the first terminal device receives the periodic PSSCH belongs to a time unit set $(t_0^{SL}, t_1^{SL}, \ldots, t_{max}^{SL})$, $t_{n'}^{SL}$ is the time unit in which the periodic PSSCH is received; otherwise, $t_{n'}^{SL}$ is the $1^{st}$ time unit that belongs to the time unit set $(t_0^{SL}, t_1^{SL}, \ldots, t_{max}^{SL})$ and that is after the time unit n.

After the first terminal device determines that the first time unit in the first time unit set is used to send the PSSCH, because the PSSCH to be transmitted by the first terminal device is periodic, for periodic PSSCH transmission, it may be determined that a second time unit set after the first time unit in the first time unit set is used to send the PSSCH. In other words, S130 is performed: The first terminal device determines the second time unit set, where each time unit in the second time unit set is used to send the PSSCH.

Specifically, the first terminal device determines the second time unit set from the first time unit set based on a first time domain interval and a reservation quantity N, where a time unit in the second time unit set is used to send the PSSCH, the second time unit set includes N−1 time units, a time domain interval between the $1^{st}$ time unit in the second time unit set and the first time unit is the first time domain interval, a time domain interval between any two adjacent time units in the second time unit set is the first time domain interval, and a number of a time unit in the second time unit set is greater than that of the first time unit.

For example, in correspondence to the foregoing two solutions described in S121 and S122, a satisfied time domain interval relationship between a time unit in the second time unit set and the first time unit includes the following two possibilities:

Possibility 1

The first terminal device receives the semi-persistent scheduling (SPS) information from the network device, where the SPS information indicates that the first time unit in the first time unit set is used to send the periodic data, the SPS information includes an SPS period $P_{SPS}$, $P_{SPS}$ is used to determine the first time domain interval, and the first time domain interval $P_{SPS}$ is expressed as a product of the quantity $S_{symbol}$ of time units available for sidelink communication transmission in one frame structure period and a quantity of system frames included in the SPS period $P_{SPS}$; and a time domain interval between the $M^{th}$ time unit in the second time unit set and the first time unit is M first time domain intervals, and M is a positive integer less than or equal to N−1.

The quantity of system frames included in the period $P_{SPS}$ is expressed as a ratio between the period $P_{SPS}$ and the total quantity $N_{symbol}$ of time units in the frame structure period, the first time domain interval $P'_{SPS}$ is expressed as $P'_{SPS}=[S_{symbol} \times P_{SPS}/N_{symbol}]$, where [ ] represents a rounding up or rounding down operation.

It is understood that the time domain interval between the $M^{th}$ time unit in the second time unit set and the first time unit is $M \times P'_{SPS}$. For example, the time domain interval between the 1st time unit in the second time unit set and the first time unit is $P'_{SPS}$.

For ease of understanding, the following briefly describes a relationship between a number of the first time unit and a number of a time unit in the second time unit set in the possibility 1.

It is assumed that the number of the first time unit is m, where m is a natural number.

For example, when a plurality of time units in the first time unit set are consecutively numbered starting from 0 in a time sequence by using a tolerance of an arithmetic progression being 1, where 0≤m<max, and max is a value obtained by subtracting 1 from a total quantity of time units in the first time unit set, a relationship between a number of the $M^{th}$ time unit in the second time unit set and the number m of the first time unit is $m+M \times P'_{SPS}$, where $0 \leq m+M \times P'_{SPS} \leq max$, and M is a positive integer less than or equal to N−1.

By comparing a relational expression between the number of the first time unit and the number of the time unit in the second time unit set and a time domain interval relational expression between the time unit in the second time unit set and the first time unit, it can be learnt that because the plurality of time units in the first time unit set are consecutively numbered in a time sequence, a number of a second time unit after the first time unit is a sum of the number of the first time unit and a time domain interval between the first time unit and the second time unit.

The following uses a specific example to describe the relationship between the number of the time unit in the second time unit set and the number of the first time unit in the possibility 1.

For example, when a subcarrier spacing is 600 kHz, refer to the first row in FIG. 9. FIG. 9 is a schematic diagram of a frame structure according to an embodiment of this application. Specifically, for the frame structure shown in the first row in FIG. 9, a period length of the frame structure is 0.5 ms, and two subframes in a system frame are selected as an example for description. Because frame structures in the system frame are periodic, subframes not shown in the figure are similar to the two subframes shown in FIG. 9.

Further, the first time unit set corresponding to the frame structure shown in the first row in FIG. 9 is shown in the second row in FIG. 9. If $S_{symbol}=14$, $N_{symbol}=28$, and $P_{SPS}=28$, $P'_{SPS}=[14 \times 28/28]=14$. When the number of the first time unit is 0, it is understood that the first time unit is the $0^{th}$ time unit in the first time unit set. According to the foregoing relationship between the number of the first time unit and the number of the time unit in the second time unit set, $m+M \times P'_{SPS}=0+1*14=14$, $m+M \times P'_{SPS}=0+2*14=28$, and so on. To be specific, the $1^{st}$ time unit in the second time unit set is numbered 14 and is the $14^{th}$ time unit in the first time unit set, and the $2^{nd}$ time unit in the second time unit set is numbered 28 and is the $28^{th}$ time unit in the first time unit set. The first time unit set shown in FIG. 9 includes only 28 time units in total, which are numbered from 0 to 27. Therefore, in the system frame shown in FIG. 9, the second time unit set is the $14^{th}$ time unit in the first time unit set and is numbered 14.

However, it should be understood that FIG. 9 is merely an example, and two subframes in the system frame are used as an example for description. Actually, there may be a plurality of subframes. Details are not described herein.

Possibility 2

The first time domain interval $P'_{rsvp\_TX}$ is expressed as a product of the quantity $S_{symbol}$ of time units available for sidelink communication transmission in one frame structure period and a quantity of system frames included in the reservation period $P_{rsvp\_TX}$ of the periodic data. If the quantity of system frames included in the reservation period $P_{rsvp\_TX}$ of the periodic data is expressed as a ratio between the reservation period $P_{rsvp\_TX}$ of the periodic data and the total quantity $N_{symbol}$ of time units in the frame structure period, the first time domain interval $P'_{rsvp\_TX}$ is expressed as $P'_{rsvp\_TX} = [S_{symbol} \times P_{rsvp\_TX}/N_{symbol}]$, where [ ] represents a rounding up or rounding down operation. A time domain interval between the $M^{th}$ time unit in the second time unit set and the first time unit is $M \times P'_{rsvp\_TX}$, M is a positive integer less than or equal to N−1, and the reservation quantity N is the reservation quantity of PSSCHs. For example, the time domain interval between the $1^{st}$ time unit in the second time unit set and the first time unit is $P'_{rsvp\_TX}$.

For ease of understanding, the following briefly describes a relationship between a number of the first time unit and a number of a time unit in the second time unit set in the possibility 2.

It is assumed that the number of the first time unit is m, where m is a natural number.

For example, when a plurality of time units in the first time unit set are consecutively numbered starting from 0 in a time sequence by using a tolerance of an arithmetic progression being 1, where 0≤m<max, and max is a value obtained by subtracting 1 from a total quantity of time units in the first time unit set, a relationship between a number of the $j^{th}$ time unit in the second time unit set and the number m of the first time unit is $m+M \times P'_{SPS}$, where $0 \le m+M \times P'_{SPS} \le max$, M is a natural number less than or equal to $C_{resel}-1$, and $C_{resel}$ is the preset reservation quantity of PSSCHs and is a constant.

Specifically, the reservation period of the PSSCH indicates an interval at which the first terminal device transmits the PSSCH twice, and the preset reservation quantity of PSSCHs indicates a quantity of times that needs to be reserved by the first terminal device for periodically transmitting the PSSCH.

By comparing a relational expression between the number of the first time unit and the number of the time unit in the second time unit set and a time domain interval relational expression between the time unit in the second time unit set and the first time unit, it can be learnt that because the plurality of time units in the first time unit set are consecutively numbered in a time sequence, a number of a second time unit after the first time unit is a sum of the number of the first time unit and a time domain interval between the first time unit and the second time unit.

The following uses a specific example to describe the relationship between the number of the time unit in the second time unit set and the number of the first time unit in the possibility 2.

For example, when a subcarrier spacing is 60 kHz, refer to the first row in FIG. 9. FIG. 9 is a schematic diagram of a frame structure according to an embodiment of this application. Specifically, for the frame structure shown in the first row in FIG. 9, a period length of the frame structure is 0.5 ms, and two subframes in a system frame are selected as an example for description. Because frame structures in the system frame are periodic, subframes not shown in the figure are similar to the two subframes shown in FIG. 9.

Further, the first time unit set corresponding to the frame structure shown in the first row in FIG. 9 is shown in FIG. 10. FIG. 10 is a schematic diagram of a time unit set according to an embodiment of this application. If $S_{symbol}=14$, $N_{symbol}=28$, and $P_{rsvp\_TX}=14$, $P'_{rsvp\_TX}=[14 \times 14/28]=7$. When the number of the first time unit is 0, it is understood that the first time unit is the $0^{th}$ time unit in the first time unit set. According to the foregoing relationship between the number of the first time unit and the number of the time unit in the second time unit set, $m+M \times P'_{rsvp\_TX}=0+1*7=7$, $m+M \times P'_{rsvp\_TX}=0+2*7=14$, and so on. To be specific, the $1^{st}$ time unit in the second time unit set is numbered 7 and is the $7^{th}$ time unit in the first time unit set, and the $2^{nd}$ time unit in the second time unit set is numbered 14 and is the $14^{th}$ time unit in the first time unit set.

Finally, the first terminal device may send the PSSCH in the first time unit and the time unit that is in the second time unit set. In other words, the first terminal device performs S140, that is, sends the PSSCH. It should be understood that sending the PSSCH in the first time unit and the time unit that is in the second time unit set in this application means sending the PSSCH on time-frequency resources whose time domain locations are the first time unit and the time unit that is in the second time unit set.

It should be understood that a number in the foregoing method embodiments does not mean an execution sequence. The execution sequence of the processes should be determined based on functions and internal logic of the processes, and should not constitute any limitation on the implementation processes of the embodiments of this application.

With reference to FIG. 8 to FIG. 10, the foregoing details the communication method provided in this application. The following details communications apparatuses in this application with reference to FIG. 11 to FIG. 14.

Figure 11:
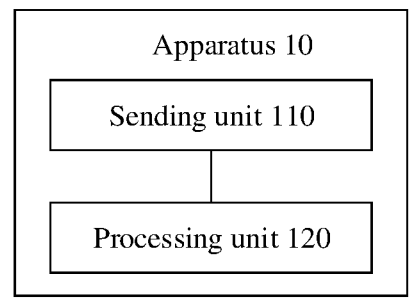
FIG. 11 is a schematic diagram of a communications apparatus 10 according to this application.

FIG. 11 is a schematic diagram of a communications apparatus 10 according to this application. As shown in FIG. 11, the apparatus 10 includes a sending unit 110 and a processing unit 120. The communications apparatus 10 may be the first terminal device in the foregoing method embodiment or a chip or a functional module inside the first terminal device.

The sending unit 110 is configured to send periodic data in a first time unit and a time unit that is in a second time unit set.

The processing unit 120 is configured to determine a first time unit set, where a time unit in the first time unit set is available for transmitting at least one of sidelink service data, sidelink control information, and sidelink feedback information, the first time unit set includes a plurality of time units, and the plurality of time units are consecutively numbered in a time sequence.

The processing unit 120 is further configured to determine the to-be-sent periodic data, where the periodic data includes at least one of the sidelink service data, the sidelink control information, and the sidelink feedback information.

The processing unit 120 is further configured to: determine the first time unit from the first time unit set, where the first time unit is used to send the periodic data; and determine a second time unit set from the first time unit set based on a first time domain interval and a reservation quantity N, where a time unit in the second time unit set is used to send the periodic data, the second time unit set includes N−1 time units, a time domain interval between the $1^{st}$ time unit in the second time unit set and the first time unit is the first time domain interval, a time domain interval between any two adjacent time units in the second time unit set is the first time domain interval, and a number of a time unit in the second time unit set is greater than that of the first time unit.

The apparatus 10 is corresponding to the first terminal device in the method embodiment, and corresponding units of the apparatus 10 are configured to perform corresponding steps performed by the first terminal device in the method embodiment shown in FIG. 8.

The sending unit 110 in the apparatus 10 performs a sending step in the method embodiment. For example, the sending unit no performs S140 in FIG. 8, that is, sends the periodic data in the first time unit and the time unit that is in the second time unit set. The processing unit 120 performs steps that are implemented or processed inside the first terminal device in the method embodiment. For example, the processing unit 120 performs S110 in FIG. 8, that is, determines the first time unit set; performs S111 in FIG. 8, that is, determines the to-be-sent periodic data; performs S120 in FIG. 8, that is, determines the first time unit; and performs S130 in FIG. 8, that is, determines the second time unit set.

Optionally, the apparatus 10 may further include a receiving unit 130, configured to receive information sent by another device. For example, the receiving unit 130 performs S121 in FIG. 8, that is, receives the SPS information sent by the network device. The sending unit no and the receiving unit 130 may constitute a transceiver unit, which has both receiving and sending functions. The processing unit 120 may be a processor, the sending unit no may be a transmitter, and the receiving unit 130 may be a receiver. The receiver and the transmitter may be integrated to constitute a transceiver.

For example, when the apparatus 10 is the terminal device in the foregoing method embodiment, the sending unit 110 and the receiving unit 130 may be antennas and an input/output apparatus of the terminal device, and the processing unit 120 may be a processor of the terminal device. When the apparatus 10 is a chip in the terminal device in the foregoing method embodiment, the sending unit no and the receiving unit 130 may be an input/output circuit on the chip, and the processing unit 120 may be a processor on the chip. When the apparatus 10 is a functional module in the terminal device in the foregoing method embodiment, the sending unit no may be a sending functional module, the receiving unit no may be a receiving functional module, and the processing unit 120 may be a processing functional module.

Figure 12:
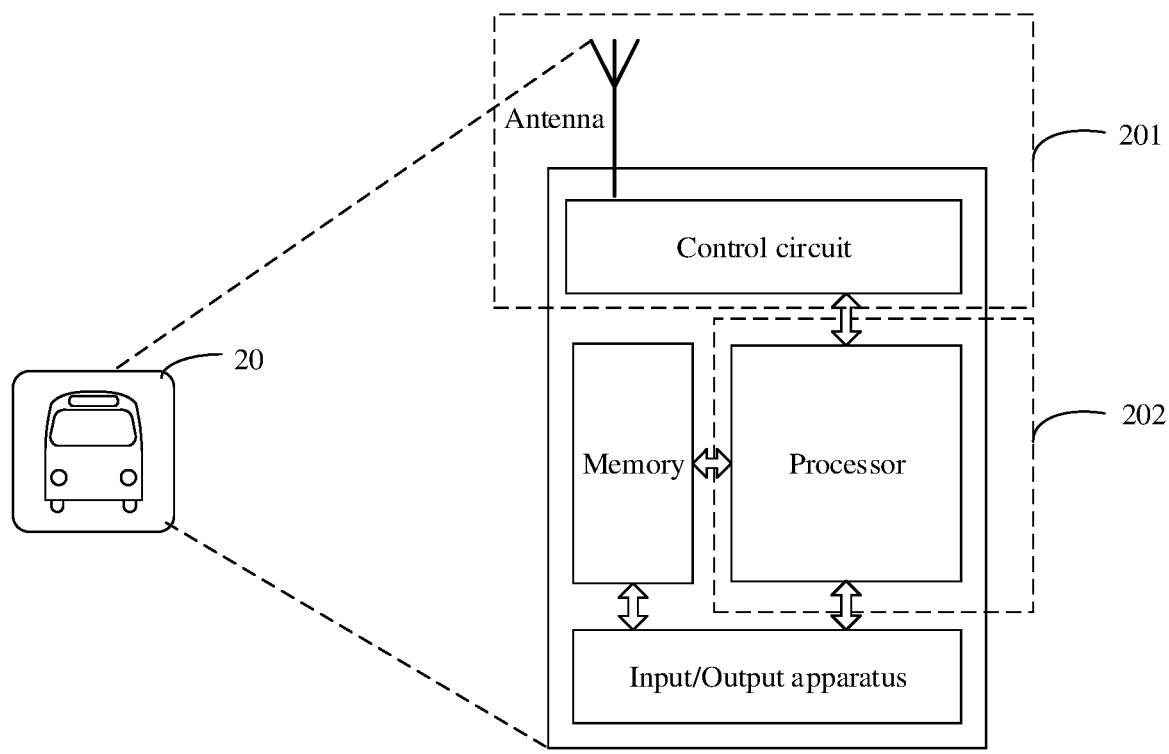
FIG. 12 is a schematic diagram of a structure of a first terminal device 20 to which an embodiment of this application is applicable.

FIG. 12 is a schematic diagram of a structure of a first terminal device 20 to which an embodiment of this application is applicable. The first terminal device 20 may be used in the system shown in FIG. 1. For ease of description, FIG. 12 shows only main components of the first terminal device. As shown in FIG. 12, the first terminal device 20 includes a processor, a memory, a control circuit, an antenna, and an input/output apparatus. The processor is configured to control the antenna and the input/output apparatus to receive/send a signal. The memory is configured to store a computer program. The processor is configured to invoke the computer program from the memory and run the computer program, to perform a corresponding procedure and/or operation performed by the first terminal device in the communication method proposed in this application. Details are not described herein.

A person skilled in the art can understand that, for ease of description, FIG. 12 shows only one memory and one processor. Actually, the first terminal device may include a plurality of processors and memories. The memory may also be referred to as a storage medium, a storage device, or the like. This is not limited in this embodiment of this application.

Figure 13:
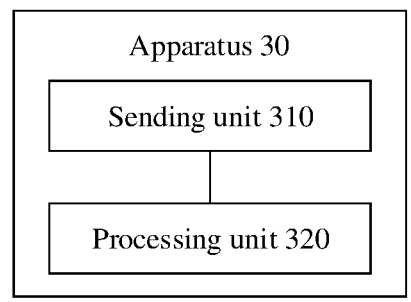
FIG. 13 is a schematic diagram of a communications apparatus 30 according to this application.

FIG. 13 is a schematic diagram of a communications apparatus 30 according to this application. As shown in FIG. 13, the apparatus 30 includes a sending unit 310 and a processing unit 320. The communications apparatus 30 may be the network device in the foregoing method embodiment or a chip or a functional module inside the network device.

The processing unit 320 is configured to determine semi-persistent scheduling (SPS) information, where the SPS information is used to indicate that a first time unit in a first time unit set is available for a first terminal device to send periodic data, where the SPS information includes an SPS period $P_{SPS}$, $P_{SPS}$ is used to determine a first time domain interval $P_{SPS}=[S_{symbol} \times P_{SPS}/N_{symbol}]$, $N_{symbol}$ represents a total quantity of time units in one frame structure period in a preset frame structure configuration, $S_{symbol}$ represents a quantity of time units available for sidelink communication transmission in one frame structure period, [ ] represents a rounding up or rounding down operation, a time unit in the first time unit set is available for transmitting at least one of sidelink service data, sidelink control information, and sidelink feedback information, the first time unit set includes a plurality of time units, and the plurality of time units are consecutively numbered in a time sequence; and the first time domain interval and a reservation quantity N are used to determine a second time unit set from the first time unit set, a time unit in the second time unit set is used by the first terminal device to send the periodic data, the second time unit set includes N−1 time units, a time domain interval between the $1^{st}$ time unit in the second time unit set and the first time unit is the first time domain interval, a time domain interval between any two adjacent time units in the second time unit set is the first time domain interval, and a number of a time unit in the second time unit set is greater than that of the first time unit; and the sending unit 310 is configured to send the SPS information to the first terminal device.

The apparatus 30 is completely corresponding to the network device in the method embodiment, and corresponding units of the apparatus 30 are configured to perform corresponding steps performed by the network device in the method embodiment shown in FIG. 8.

The sending unit 310 in the apparatus 30 performs a sending step performed by the network device in the method embodiment. For example, the sending unit 310 performs step 121 in FIG. 8, that is, sends the SPS information to the first terminal device. The processing unit 320 performs steps that are implemented or processed inside the network device in the method embodiment. For example, the processing unit 320 performs step 123 in FIG. 8, that is, determines the SPS information.

Optionally, the apparatus 30 may further include a receiving unit 330, configured to receive information sent by another device. The receiving unit 330 and the sending unit 310 may constitute a transceiver unit, which has both receiving and sending functions. The processing unit 320 may be a processor, the sending unit 310 may be a receiver, and the receiving unit 330 may be a transmitter. The receiver and the transmitter may be integrated to constitute a transceiver.

For example, when the apparatus 30 is the network device in the foregoing method embodiment, the sending unit 310 and the receiving unit 330 may be remote radio units (RRU) of the network device, and the processing unit 320 may be a baseband unit (BBU) of the network device. When the apparatus 30 is a chip in the network device in the foregoing method embodiment, the sending unit 310 and the receiving unit 330 may be an input/output circuit on the chip, and the processing unit 320 may be a processor on the chip. When the apparatus 30 is a functional module in the network device in the foregoing method embodiment, the sending unit 310 may be a sending functional module, the receiving unit 330 may be a receiving functional module, and the processing unit 320 may be a processing functional module.

Figure 14:
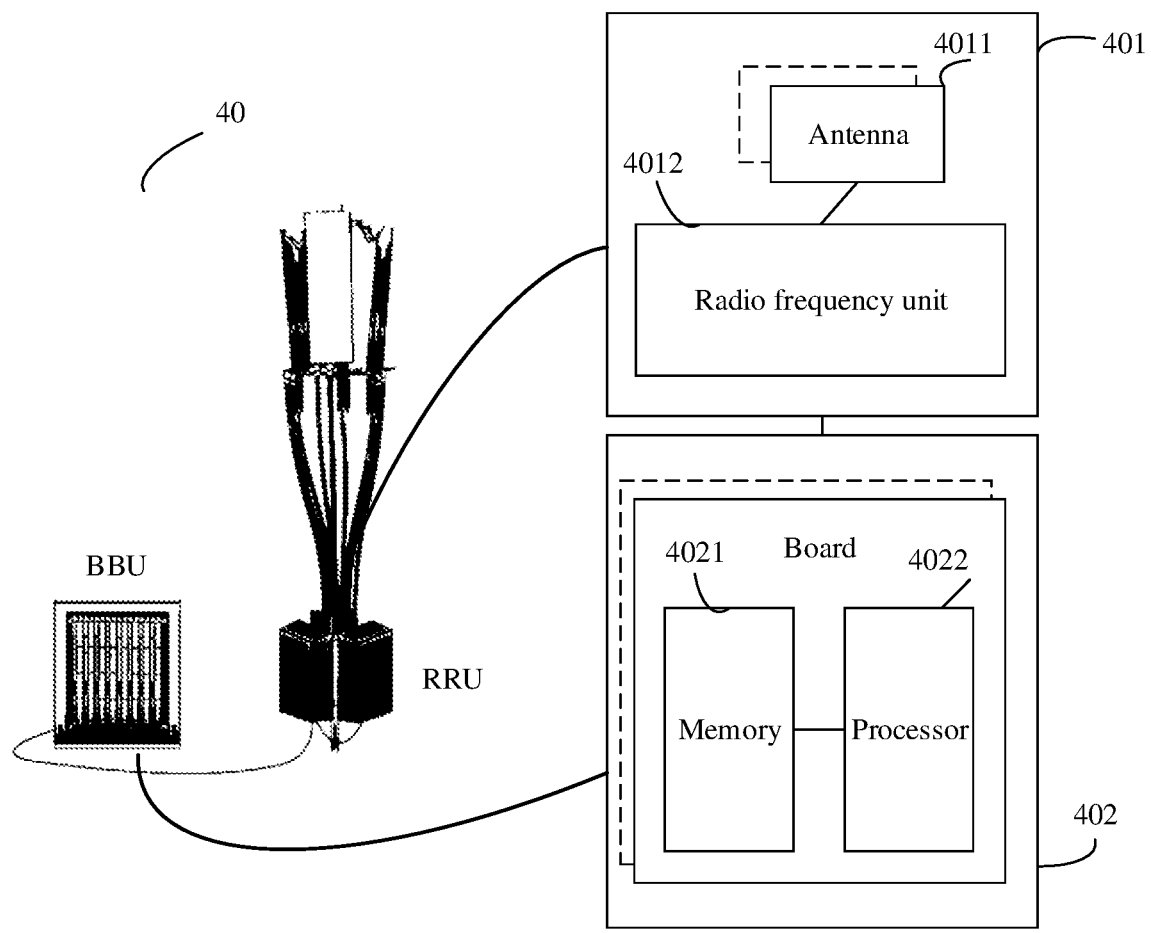
FIG. 14 is a schematic diagram of a structure of a network device 40 to which an embodiment of this application is applicable.

FIG. 14 is a schematic diagram of a structure of a network device 40 to which an embodiment of this application is applicable, and may be used to implement functions of the network device in the communication method. For example, FIG. 14 may be a schematic diagram of a structure of a base station. As shown in FIG. 14, the network device may be used in the system shown in FIG. 1.

The network device 40 may include one or more radio frequency units, for example, an RRU 401 and one or more BBUs. The baseband unit may also be referred to as a digital unit (DU) 402. The RRU 401 may be referred to as a transceiver unit, and is corresponding to the sending unit 310 in FIG. 13. Optionally, the transceiver unit 401 may also be referred to as a transceiver, a transceiver circuit, or the like, and may include at least one antenna 4011 and a radio frequency unit 4012. Optionally, the transceiver unit 401 may include a receiving unit and a sending unit. The receiving unit may be corresponding to a receiver (or referred to as a receiver circuit), and the sending unit may be corresponding to a transmitter (or referred to as a transmitter circuit). The part RRU 401 is mainly configured to receive/send a radio frequency signal and perform conversion between a radio frequency signal and a baseband signal, for example, configured to send the control information in the foregoing embodiment to the first terminal device. The part BBU 402 is mainly configured to perform baseband processing, control the base station, and the like. The RRU 401 and the BBU 402 may be physically disposed together; or may be physically disposed separately, that is, the RRU 401 and the BBU 402 constitute a distributed base station.

The BBU 402 is a control center of the network device, and may also be referred to as a processing unit. The BBU 402 may be corresponding to the processing unit 320 in FIG. 13, and is mainly configured to implement baseband processing functions, such as channel coding, multiplexing, modulation, and spread spectrum. The BBU (processing unit) 402 may be configured to control the network device 40 to perform an operation procedure related to the network device in the foregoing method embodiment, for example, determine duration of a time unit that carries the control information of the first terminal device.

In an example, the BBU 402 may include one or more boards. A plurality of boards can jointly support a radio access network (such as an LTE system or a 5G system) in a single access standard, or each can support a radio access network in a different access standard. The BBU 402 further includes a memory 4021 and a processor 4022. The memory 4021 is configured store necessary instructions and data. For example, the memory 4021 stores a codebook and the like in the foregoing embodiment. The processor 4022 is configured to control the base station to perform necessary actions, for example, configured to control the base station to perform an operation procedure related to the network device in the foregoing method embodiment. The memory 4021 and the processor 4022 may serve one or more boards. In other words, a memory and a processor may be disposed on each board. Alternatively, a same memory and processor may be shared by a plurality of boards. In addition, a necessary circuit may further be disposed on each board.

It should be understood that the network device 40 shown in FIG. 14 can implement functions related to the network device in the method embodiment in FIG. 8 to FIG. 10. Operations and/or functions of the units in the network device 40 are used to implement a corresponding procedure performed by the network device in the foregoing method embodiments. To avoid repetition, detailed descriptions are properly omitted herein. The structure of the network device shown in FIG. 14 is merely a possible form, and should not constitute any limitation on this embodiment of this application. A possibility that a network device structure of another form may emerge in the future is not excluded in this application.

An embodiment of this application further provides a communications system, including the foregoing network device and one or more first terminal devices.

This application further provides a computer-readable storage medium. The computer-readable storage medium stores instructions. When the instructions are run on a computer, the computer is enabled to perform steps performed by the network device in the method shown in FIG. 8 to FIG. 10.

This application further provides a computer-readable storage medium. The computer-readable storage medium stores instructions. When the instructions are run on a computer, the computer is enabled to perform steps performed by the first terminal device in the method shown in FIG. 8 to FIG. 10.

This application further provides a computer program product including instructions. When the computer program product runs on a computer, the computer is enabled to perform steps performed by the network device in the method shown in FIG. 8 to FIG. 10.

This application further provides a computer program product including instructions. When the computer program product runs on a computer, the computer is enabled to perform steps performed by the first terminal device in the method shown in FIG. 8 to FIG. 10.

This application further provides a chip, including a processor. The processor is configured to read and run a computer program stored in a memory, to perform a corresponding operation and/or procedure performed by the first terminal device in the communication method provided in this application. Optionally, the chip further includes the memory. The memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

This application further provides an apparatus. The apparatus may be a communications chip or an integrated module including a communications chip, and includes a processor. The processor is configured to invoke and run a computer program stored in a memory, to perform a corresponding operation and/or procedure performed by the network device in the communication method provided in this application. Optionally, the chip further includes the memory. The memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits configured to control execution of programs in the technical solutions of this application, or the like. For example, the processor may be a digital signal processing device, a microprocessor device, an analog-to-digital converter, or a digital-to-analog converter. The processor may allocate control and signal processing functions of the terminal device or the network device among these devices based on respective functions of these devices. In addition, the processor may have a function of operating one or more software programs, and the software program may be stored in the memory. The functions of the processor may be implemented by using hardware, or may be implemented by hardware executing corresponding software. The hardware or the software includes one or more modules corresponding to the foregoing functions.

The memory may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. Optionally, the memory and the processor in the foregoing embodiments may be physically independent units, or the memory may be integrated with the processor.

In the embodiment of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be in a singular form or a plural form. The character "/" generally indicates an "or" relationship between the associated objects. "The following at least one (item)" or a similar expression thereof means any combination of these items, including a singular (item) or any combination of plural (items). For example, at least one (item) of a, b, or c may represent a; b; c; a and b; a and c; b and c; or a, b, and c, where a, b, and c each may be in a singular or plural form.

A person of ordinary skill in the art may be aware that the units and algorithm steps described in the embodiments disclosed in this specification can be implemented by a combination of electronic hardware, computer software, and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiments are merely examples. For example, the module division is merely logical function division and may be other division in actual implementation. For example, a plurality of modules or components may be combined or integrated into another system. For example, a plurality of units or components may be combined or may be integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units as separate parts may not be physically separate, and parts displayed as units may not be physical units, may be located in one position, or may be distributed on a plurality of network units. Some or all of the units may be selected based on actual requirements to achieve the objectives of the technical solutions of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or a part contributing to a current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A communication method, comprising:
    determining a first time unit set, a time unit in the first time unit set being available for transmitting at least one of sidelink service data, sidelink control information, and sidelink feedback information, the first time unit set comprising a plurality of time units, the plurality of time units being consecutively numbered in a time sequence, and the time unit comprising a symbol or a slot;
    determining to-be-sent periodic data, the periodic data comprising at least one of the sidelink service data, the sidelink control information, and the sidelink feedback information;
    determining a first time unit from the first time unit set, the first time unit being used to send the periodic data;
    determining a second time unit set from the first time unit set based on a first time domain interval and a reservation quantity N, a time unit in the second time unit set being used to send the periodic data, the second time unit set comprising N−1 time units, a time domain interval between a first one of time unit in the second time unit set and the first time unit being the first time domain interval, a time domain interval between any two adjacent time units in the second time unit set is the first time domain interval, and a number of a time unit in the second time unit set being greater than that of the first time unit; and sending the periodic data in the first time unit and the time unit that is in the second time unit set.

2. The communication method according to claim 1, wherein the determining a first time unit from the first time unit set comprises:

receiving semi-persistent scheduling (SPS) information from a network device, wherein the SPS information indicates that the first time unit in the first time unit set is used to send the periodic data, the SPS information comprises an SPS period $P_{SPS}$, the SPS period $P_{SPS}$ is used to determine the first time domain interval, and the first time domain interval $P'_{SPS}$ is expressed as a product of a quantity $S_{symbol}$ of time units available for sidelink communication transmission in one frame structure period and a quantity of system frames comprised in the SPS period $P_{SPS}$; and a time domain interval between a Mth time unit in the second time unit set and the first time unit is M first time domain intervals, and M is a positive integer less than or equal to N−1.

3. The communication method according to claim 2, wherein the quantity of system frames comprised in the period $P^{SPS}$ is expressed as a ratio between the period $P_{SPS}$ and a total quantity $N_{symbol}$ of time units in the frame structure period, the first time domain interval $P'_{SPS}$ is expressed as $P'_{SPS}=[S_{symbol} \times P_{SPS}/N_{symbol}]$, wherein [ ] represents a rounding up or rounding down operation.

4. The communication method according to claim 1, wherein the determining a first time unit from the first time unit set comprises:

determining historical periodic data that is sent in a third time unit set;

determining at least one time unit that is in a fourth time unit set and that is reserved for the historical periodic data; and determining the first time unit from a remaining time unit, wherein the remaining time unit is a time unit that is left in the fourth time unit set after a time unit that satisfies a preset time relationship with the at least one time unit reserved for the historical periodic data is excluded, wherein the periodic data arrives in a third time unit, the third time unit set comprises P time units before the third time unit, P is a positive integer, the third time unit set is a subset of the first time unit set, the fourth time unit set is a subset of the first time unit set, a start time unit in the fourth time unit set is later than the third time unit, and the P time units are consecutively numbered from n'-P to n'-1; and n' comprises the following:
when the third time unit is a time unit in the first time unit set, n' is a number of the third time unit in the first time unit set; or
when the third time unit is not a time unit in the first time unit set, n' is a number of the first time unit that belongs to the first time unit set and that is after the third time unit.

5. The communication method according to claim 4, wherein the determining historical periodic data that is sent in a third time unit set comprises:

determining first historical periodic data that is sent in a fourth time unit in the third time unit set; and the determining at least one time unit that is in a fourth time unit set and that is reserved for the historical periodic data comprises:

determining at least one time unit that is in the fourth time unit set and that is reserved for the first historical periodic data.

6. The communication method according to claim 5, wherein the remaining time unit comprises:

a time unit that is left in the fourth time unit set after a time unit that satisfies a first preset time relationship with the at least one time unit reserved for the first historical periodic data is excluded, wherein the first preset time relationship is that there is a natural number j that makes the following equation hold true:

$$y+j \times [S_{symbol} \times P_{rsvp\_TX}/N_{symbol}]=z+q \times [S_{symbol} \times P''_{rsvp\_TX}/N_{symbol}], \text{ wherein}$$

$z+q \times [S_{symbol} \times P''_{rsvp\_TX}/N_{symbol}]$ represents a number of the at least one time unit reserved for the first historical periodic data, z is a number of the fourth time unit, q is a positive integer less than or equal to Q1, y is a number of the time unit that satisfies the first preset time relationship with the at least one time unit reserved for the first historical periodic data, j is a natural number less than or equal to $C_{resel\_1}$, $C_{resel}$ is the reservation quantity of the periodic data, $N_{symbol}$ represents a total quantity of time units in one frame structure period, $S_{symbol}$ represents a quantity of time units available for sidelink communication transmission in one frame structure period, $P_{rsvp\_TX}$ represents a reservation period of the periodic data, the reservation period of the periodic data is measured in time units, $P''_{rsvp\_TX}$ represents a reservation period of the first historical periodic data, the reservation period of the first historical periodic data is measured in time units, and [ ] represents a rounding up or rounding down operation.

7. The communication method according to claim 6, wherein when $P''_{rsvp\_TX}/(K*N_{symbol})<1$ and $n-z \leq [S_{symbol} \times P''_{rsvp\_TX}/N_{symbol}]$, $Q1=K/(P''_{rsvp\_TX}/N_{symbol})$; and otherwise, Q1=1, wherein K is a positive integer.

8. A communications apparatus, comprising:
a memory storage comprising instructions; and
one or more processors in communication with the memory storage, wherein the execution of the instructions by the one or more processors causes the apparatus to:

determine a first time unit set, wherein a time unit in the first time unit set is available for transmitting at least one of sidelink service data, sidelink control information, and sidelink feedback information, the first time unit set comprises a plurality of time units, and the plurality of time units are consecutively numbered in a time sequence, wherein determine to-be-sent periodic data, wherein the periodic data comprises at least one of the sidelink service data, the sidelink control information, and the sidelink feedback information;

determine a first time unit from the first time unit set, wherein the first time unit is used to send the periodic data; and determine a second time unit set from the first time unit set based on a first time domain interval and a reservation quantity N, wherein a time unit in the second time unit set is used to send the periodic data, the second time unit set comprises N−1 time units, a time domain interval between a first one of time unit in the second time unit set and the first time unit is the first time domain interval, a time domain interval between any two adjacent time units in the second time unit set is the first time domain interval, and a number of a time unit in the second time unit set is greater than that of the first time unit; and send the periodic data in the first time unit and the time unit that is in the second time unit set.

9. The communications apparatus according to claim 8, wherein the execution of the instructions by the one or more processors further causes the apparatus to:

receive semi-persistent scheduling (SPS) information from a network device, wherein the SPS information indicates that the first time unit in the first time unit set is used to send the periodic data, the SPS information comprises an SPS period $P_{SPS}$, the SPS period $P_{SPS}$ is used to determine the first time domain interval, and the first time domain interval $P'_{SPS}$ is expressed as a product of a quantity $S_{symbol}$ of time units available for sidelink communication transmission in one frame structure period and a quantity of system frames comprised in the SPS period $P_{SPS}$; and a time domain interval between a Mth time unit in the second time unit set and the first time unit is M first time domain intervals, and M is a positive integer less than or equal to N−1.

10. The communications apparatus according to claim 9, wherein the quantity of system frames comprised in the SPS period $P_{SPS}$ is expressed as a ratio between the SPS period $P_{SPS}$ and a total quantity $N_{symbol}$ of time units in the frame structure period, the first time domain interval $P'_{SPS}$ is expressed as $P'_{SPS}=[S_{symbol} \times P_{SPS}/N_{symbol}]$, wherein [ ] represents a rounding up or rounding down operation.

11. The communications apparatus according to claim 8, wherein the execution of the instructions by the one or more processors causes the apparatus to:

determine historical periodic data that is sent in a third time unit set;

determine at least one time unit that is in a fourth time unit set and that is reserved for the historical periodic data; and determine the first time unit from a remaining time unit, wherein the remaining time unit is a time unit that is left in the fourth time unit set after a time unit that satisfies a preset time relationship with the at least one time unit reserved for the historical periodic data is excluded, wherein the periodic data arrives in a third time unit, the third time unit set comprises P time units before the third time unit, P is a positive integer, the third time unit set is a subset of the first time unit set, the fourth time unit set is a subset of the first time unit set, a start time unit in the fourth time unit set is later than the third time unit, and the P time units are consecutively numbered from n'−P to n'−1; and n' comprises the following:

when the third time unit is a time unit in the first time unit set, n' is a number of the third time unit in the first time unit set; or when the third time unit is not a time unit in the first time unit set, n' is a number of the first time unit that belongs to the first time unit set and that is after the third time unit.

12. The communications apparatus according to claim 11, wherein the execution of the instructions by the one or more processors causes the apparatus to:

determine first historical periodic data that is sent by the sending unit in a fourth time unit in the third time unit set; and determine at least one time unit that is in the fourth time unit set and that is reserved for the first historical periodic data.

13. The communications apparatus according to claim 12, wherein the remaining time unit comprises:

a time unit that is left in the fourth time unit set after a time unit that satisfies a first preset time relationship with the at least one time unit reserved for the first historical periodic data is excluded, wherein the first preset time relationship is that there is a natural number j that makes the following equation hold true:

$$y+j \times [S_{symbol} \times P_{rsvp\_TX}/N_{symbol}] = z+q \times [S_{symbol} \times P''_{rsvp\_TX}/N_{symbol}],\ \text{wherein}$$

$z+q \times [S_{symbol} \times P''_{rsvp\_TX}/N_{symnol}]$ represents a number of the at least one time unit reserved for the first historical periodic data, z is a number of the fourth time unit, q is a positive integer less than or equal to Q1, y is a number of the time unit that satisfies the first preset time relationship with the at least one time unit reserved for the first historical periodic data, j is a natural number less than or equal to $C_{resel\_1}$, $C_{resel}$ is the reservation quantity of the periodic data, $S_{symbol}$ represents a quantity of time units available for sidelink communication transmission in one frame structure period, $N_{symbol}$ represents a total quantity of time units in one frame structure period, $P_{rsvp\_TX}$ represents a reservation period of the periodic data, the reservation period of the periodic data is measured in time units, $P''_{rsvp\_TX}$ represents a reservation period of the first historical periodic data, the reservation period of the first historical periodic data is measured in time units, and [ ] represents a rounding up or rounding down operation.

14. The communications apparatus according to claim 13, wherein when $$P''_{rsvp\_TX}/(K*N_{symbol})<1\ \text{and}\ n-z \leq [S_{symbol} \times P''_{rsvp\_TX}/N_{symbol}], Q1=K/(P''_{rsvp\_TX}/N_{symbol});$$

and otherwise, Q1=1, wherein K is a positive integer.

15. A non-transitory computer-readable storage medium comprising instructions which, when executed by at least one processor, cause the at least one processor to:

determine a first time unit set, wherein a time unit in the first time unit set is available for transmitting at least one of sidelink service data, sidelink control information, and sidelink feedback information, the first time unit set comprises a plurality of time units, the plurality of time units are consecutively numbered in a time sequence, and the time unit comprises a symbol or a slot;

determine to-be-sent periodic data, wherein the periodic data comprises at least one of the sidelink service data, the sidelink control information, and the sidelink feedback information;

determine a first time unit from the first time unit set, wherein the first time unit is used to send the periodic data;

determine a second time unit set from the first time unit set based on a first time domain interval and a reservation quantity N, wherein a time unit in the second time unit set is used to send the periodic data, the second time unit set comprises N−1 time units, a time domain interval between first one of time unit in the second time unit set and the first time unit is the first time domain interval, a time domain interval between any two adjacent time units in the second time unit set is the first time domain interval, and a number of a time unit in the second time unit set is greater than that of the first time unit; and send the periodic data in the first time unit and the time unit that is in the second time unit set.

16. The non-transitory computer-readable storage medium according to claim 15, wherein when executed by at least one processor, cause the at least one processor to:
receive semi-persistent scheduling (SPS) information from a network device, wherein the SPS information indicates that the first time unit in the first time unit set is used to send the periodic data, the SPS information comprises an SPS period $P_{SPS}$, the SPS period $P_{SPS}$ is used to determine the first time domain interval, and the first time domain interval $P'_{SPS}$ is expressed as a product of a quantity $S_{symbol}$ of time units available for sidelink communication transmission in one frame structure period and a quantity of system frames comprised in the SPS period $P_{SPS}$; and a time domain interval between a Mth time unit in the second time unit set and the first time unit is M first time domain intervals, and M is a positive integer less than or equal to N−1.

17. The non-transitory computer-readable storage medium according to claim 16, wherein the quantity of system frames comprised in the period $P_{SPS}$ is expressed as a ratio between the period $P_{SPS}$ and a total quantity $N_{symbol}$ of time units in the frame structure period, the first time domain interval $P'_{SPS}$ is expressed as $P'_{SPS}=[S_{symbol} \times P_{SPS}/N_{symbol}]$, wherein [ ] represents a rounding up or rounding down operation.

18. The non-transitory computer-readable storage medium according to claim 15, wherein when executed by at least one processor, cause the at least one processor to:
determine historical periodic data that is sent in a third time unit set;
determine at least one time unit that is in a fourth time unit set and that is reserved for the historical periodic data; and
determine the first time unit from a remaining time unit, wherein the remaining time unit is a time unit that is left in the fourth time unit set after a time unit that satisfies a preset time relationship with the at least one time unit reserved for the historical periodic data is excluded, wherein
the periodic data arrives in a third time unit, the third time unit set comprises P time units before the third time unit, P is a positive integer, the third time unit set is a subset of the first time unit set, the fourth time unit set is a subset of the first time unit set, a start time unit in the fourth time unit set is later than the third time unit, and the P time units are consecutively numbered from n'-P to n'−1; and n' comprises the following:
when the third time unit is a time unit in the first time unit set, n' is a number of the third time unit in the first time unit set; or
when the third time unit is not a time unit in the first time unit set, n' is a number of the first time unit that belongs to the first time unit set and that is after the third time unit.

19. The non-transitory computer-readable storage medium according to claim 18, wherein when executed by at least one processor, cause the at least one processor to:
determine first historical periodic data in a fourth time unit in the third time unit set; and
the determine at least one time unit that is in a fourth time unit set and that is reserved for the historical periodic data comprises:
determine at least one time unit that is in the fourth time unit set and that is reserved for the first historical periodic data.

20. The non-transitory computer-readable storage medium according to claim 19, wherein the remaining time unit comprises:
a time unit that is left in the fourth time unit set after a time unit that satisfies a first preset time relationship with the at least one time unit reserved for the first historical periodic data is excluded, wherein
the first preset time relationship is that there is a natural number j that makes the following equation hold true:

$$y+j \times [S_{symbol} \times P_{rsvp\_TX}/N_{symbol}] = z+q \times [S_{symbol} \times P''_{rsvp\_TX}/N_{symbol}], \text{ wherein}$$

$z+q \times [S_{symbol} \times P''_{rsvp\_TX}/N_{symbol}]$ represents a number of the at least one time unit reserved for the first historical periodic data, z is a number of the fourth time unit, q is a positive integer less than or equal to Q1, y is a number of the time unit that satisfies the first preset time relationship with the at least one time unit reserved for the first historical periodic data, j is a natural number less than or equal to $C_{resel\_1}$, $C_{resel}$ is the reservation quantity of the periodic data, $N_{symbol}$ represents a total quantity of time units in one frame structure period, $S_{symbol}$ represents a quantity of time units available for sidelink communication transmission in one frame structure period, $P_{rsvp\_TX}$ represents a reservation period of the periodic data, the reservation period of the periodic data is measured in time units, $P''_{rsvp\_TX}$ represents a reservation period of the first historical periodic data, the reservation period of the first historical periodic data is measured in time units, and [ ] represents a rounding up or rounding down operation.

* * * * *

UNITED STATES PATENT AND TRADEMARK OFFICE
CERTIFICATE OF CORRECTION

PATENT NO. : 12,016,002 B2
APPLICATION NO. : 17/508632
DATED : June 18, 2024
INVENTOR(S) : Dong et al.

It is certified that error appears in the above-identified patent and that said Letters Patent is hereby corrected as shown below:

In the Claims

In Column 41, in Claim 3, Line 30, delete "$P^{SPS}$" and insert -- $P_{SPS}$ --.

In Column 44, in Claim 13, Line 21, delete "$z+q \times [S_{symbol} \times P''_{rsvp\_TX}/N_{symnol}]$" and insert -- $z+q \times \left[ S_{symbol} \times P''_{rsvp\_TX} / N_{symbol} \right]$ --.

In Column 44, in Claim 14, Line 44, after "and" delete "n" and insert -- n' --.

Signed and Sealed this
Third Day of September, 2024

Katherine Kelly Vidal
Director of the United States Patent and Trademark Office